United States Patent
Yim et al.

(10) Patent No.: US 8,596,890 B2
(45) Date of Patent: Dec. 3, 2013

(54) PAN-TILT APPARATUS

(75) Inventors: Jin Whan Yim, Goyang-si (KR); Tae Hoon Kwon, Incheon (KR); Gyu Bong Han, Bucheon-si (KR)

(73) Assignee: Robomech Co., Ltd. (KR)

( * ) Notice: Subject to any disclaimer, the term of this patent is extended or adjusted under 35 U.S.C. 154(b) by 117 days.

(21) Appl. No.: 13/142,498

(22) PCT Filed: Jan. 12, 2010

(86) PCT No.: PCT/KR2010/000181
§ 371 (c)(1),
(2), (4) Date: Jun. 28, 2011

(87) PCT Pub. No.: WO2010/080012
PCT Pub. Date: Jul. 15, 2010

(65) Prior Publication Data
US 2011/0268433 A1 Nov. 3, 2011

(30) Foreign Application Priority Data

Jan. 12, 2009 (KR) .......................... 10-2009-0002343
Jan. 8, 2010 (KR) .......................... 10-2010-0001953

(51) Int. Cl.
*G03B 17/00* (2006.01)
*F16M 11/04* (2006.01)

(52) U.S. Cl.
USPC ......... 396/419; 396/427; 348/143; 248/187.1

(58) Field of Classification Search
USPC ........ 396/427, 419, 428; 348/143; 248/187.1, 248/183.1, 183.2
See application file for complete search history.

(56) References Cited

U.S. PATENT DOCUMENTS

| | | | | |
|---|---|---|---|---|
| 5,850,579 A | * | 12/1998 | Melby et al. | 396/427 |
| 7,503,708 B2 | * | 3/2009 | Yang et al. | 396/427 |
| 7,658,554 B2 | * | 2/2010 | Takahashi | 396/427 |
| 7,841,783 B2 | * | 11/2010 | Harvey | 396/428 |

FOREIGN PATENT DOCUMENTS

| | | |
|---|---|---|
| KR | 10-2003-0073854 | 9/2003 |
| KR | 10-2004-0086068 | 10/2004 |

OTHER PUBLICATIONS

International Search Report—PCT/KR2010/000181 dated Aug. 16, 2010.

* cited by examiner

*Primary Examiner* — Christopher Mahoney
(74) *Attorney, Agent, or Firm* — Cantor Colburn LLP

(57) ABSTRACT

Provided is a pan-tilt apparatus for a surveillance camera, including an image capturing unit 100 including a camera 2 and a camera holder 4 for supporting the camera 2; a motion converter 150 including a driving shaft 10, a shaft 20 connected to a connector 14 inserted into the driving shaft 10, a base member 30 inserted into one side of the driving shaft 10 and of which both ends are inserted in the shaft 20 by including a bearing 24, a bearing 32 installed in a lower portion of the base member 30 to smoothen an operation of the base member 30, and first and second worms 50 and 52 inserted into the base member 30 and mutually connected with first and second worm gears 40 and 42 to rotate; and a driving unit 250 including first and second motors 80 and 82 being connected to first and second motor shafts 60 and 62 to be inserted into the first and second worm gears 40 and 42.

15 Claims, 28 Drawing Sheets

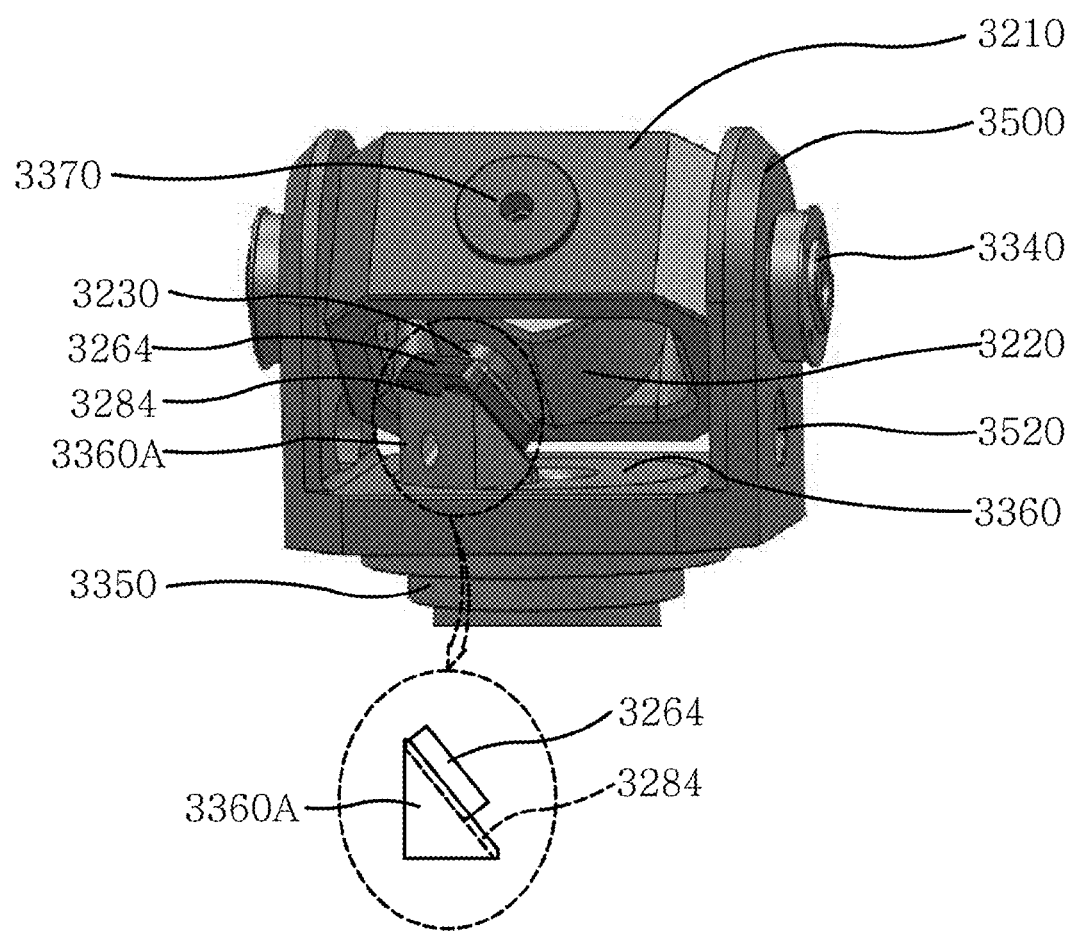

PAN-TILT APPARATUS

CROSS-REFERENCE TO RELATED APPLICATION

This application claims the benefit of Korean Patent Application No. 10-2009-0002343, filed on Jan. 12, 2009; and Korean Patent Application No. 10-2010-0001953, filed on Jan. 8, 2010 in the Korean Intellectual Property Office, the disclosure of which is incorporated herein by reference.

BACKGROUND OF THE INVENTION

1. Field of the Invention

The present invention relates to a pan-tilt apparatus, and more particularly, to a pan-tilt apparatus that enables a camera to perform a tilting motion by means of a joint apparatus for converting a rotary motion of a motor to a reciprocal rotary motion and enables a target to perform a panning motion by employing a rotary motion of another motor using a belt or a gear.

2. Description of the Related Art

Currently, due to increase in the number of vehicles, roads are being more congested. Therefore, in a region where the traffic is flowing smoothly, many drivers are driving fast, which results in increasing car accidents. To control such speeding vehicles, a movable speed measurement apparatus or an unmanned surveillance camera has been installed.

In the case of a surveillance camera generally installed as an unmanned surveillance means in a predetermined location where illegal acts such as a traffic violation, for example, a speeding, and the like, frequently occurs, a pan-tilt apparatus for vertically and horizontally adjusting a rotation angle of the surveillance camera is installed in the surveillance camera to expand a surveillance area with respect to an installation region. A rotation adjustment operation of the pan-tilt apparatus may control a focus, a perspective distance, and the rotation angle of the surveillance camera by manipulating buttons of a turning controller that is fixably installed in a predetermined office and the like.

However, in the conventional pan-tilt apparatus, a housing installed with a motor and a surveillance camera may need to perform a panning motion and a tilting motion together and thus, a rotation speed of a camera may be slowed down. Accordingly, it may be difficult to watch a quickly moving object, for example, a vehicle and the like.

SUMMARY OF THE INVENTION

The present invention is conceived to outperform the problems found in the conventional art and thus, provides a pan-tilt apparatus for a surveillance camera that enables a camera to perform a tilting motion by means of a joint apparatus for converting a rotary motion of a motor to a reciprocal rotary motion, and enables the camera to perform a panning motion by transferring a rotary motion of another motor to the camera using a belt or a gear.

Also, the present invention provides a pan-tilt apparatus for a surveillance camera that enables only a camera to perform a panning/tilting motion by separating a motion converter and a motor installer, and thereby may readily watch even a fast moving object, for example, a vehicle.

Also, the present invention also provides a pan-tilt apparatus for a surveillance camera that may be adaptable to a height change by a tolerance accumulation occurring in assembly and processing by providing a vertical height changeable titling connector to a motion convertor.

According to an aspect of the present invention, there is provided a pan-tilt apparatus for a surveillance camera, including: an image capturing unit including a camera and a camera holder for supporting the camera; a motion converter including a driving shaft, a shaft being connected to a connector that is inserted into the driving shaft, a base member being inserted into one side of the driving shaft and of which both ends are inserted into the shaft by including a bearing, a bearing being installed in a lower portion of the base member to smoothen an operation of the base member, a first worm being inserted into the base member and being mutually connected with a first worm gear to rotate, and a second worm being inserted into the driving shaft and being mutually connected with a second worm gear to rotate; and a driving unit including a first motor and a second motor being respectively connected to a first motor shaft and a second motor shaft that are inserted into the first worm gear and the second worm gear, respectively. Both ends of the camera holder of the image capturing unit may be inserted into the shaft of the motion converter for panning and tilting. A slope may be formed on one side of the driving shaft of the motion converter, a through hole may be formed in the slope, and a through hole may be formed in each of the connector and the shaft. The connector may be inserted into the through hole of the slope, and the connector and the shaft may be connected to each other by matching the through hole of the connector and the through hole of the shaft and then inserting a pin into the matched through holes.

According to another aspect of the present invention, there is provided a pan-tilt apparatus for a surveillance camera, including: an image capturing unit including a camera and a camera holder for supporting the camera; a motion converter including a driving shaft, a shaft being connected to a C-type connector that is inserted into the driving shaft, a base member being inserted into one side of the driving shaft and of which both ends are inserted into the shaft, a first worm being mutually connected with a first worm gear to rotate, and a second worm being inserted into the driving shaft and being mutually connected with the second worm gear to rotate; and a driving unit including a first motor and a second motor being respectively connected to a first motor shaft and a second motor shaft that are inserted into the first worm gear and the second worm gear, respectively. Both ends of the camera holder of the image capturing unit may be inserted into the shaft of the motion converter for panning and tilting. A through hole may be formed in each of both ends of the C-type connector of the motion converter, a protrusion may be formed on a center of the shaft, and the protrusion of the shaft may be inserted into the through hole of the C-type connector and thereby is connected to the C-type connector.

According to still another aspect of the present invention, there is provided a pan-tilt apparatus for a surveillance camera, including: a support portion including a camera and a camera holder for supporting the camera; a motion converter including a tilting shaft having an inclined member, a panning shaft being inserted onto an outside of the tilting shaft, a connection pin being inserted into the inclined member of the tilting shaft, a T-type center mechanism being inserted into the connection pin, a T-type tilting mechanism being connected to the T-type center mechanism and of which both ends are inserted into a base member, and first and second worms being inserted into the base member and being mutually connected with first and second worm gears to rotate; and a driving unit including a first motor and a second motor being respectively connected to a first motor shaft and a second motor shaft that are inserted into the first worm gear and the second worm gear, respectively.

According to yet another aspect of the present invention, there is provided a pan-tilt apparatus for a surveillance camera, including: an image capturing unit; a motion converter including a tilting shaft, a panning shaft being inserted onto an outside of the tilting shaft, an R-type tilting connector being inserted into one side of at least one auxiliary shaft that is connected to the tilting shaft, an R-type center mechanism being formed with a through hole to be inserted into a connection pin that is inserted into the R-type tilting connector, a hollow R-type tilting mechanism being formed with a through hole and a pin hole that face each other, and being inserted into a base member, and first and second worms being inserted into the base member and being mutually connected with first and second worm gears to rotate; and a driving unit including a first motor and a second motor being respectively connected to a first motor shaft and a second motor shaft that are inserted into the first worm gear and the second worm gear, respectively.

BRIEF DESCRIPTION OF THE DRAWINGS

The above and/or other aspects of the present invention will become apparent and more readily appreciated from the following description of the exemplary embodiments, taken in conjunction with the accompanying drawings in which:

FIG. 41 is a perspective view illustrating a motion converter of a pan-tilt apparatus according to still another embodiment of the present invention.

DETAILED DESCRIPTION OF THE INVENTION

Figure 1:
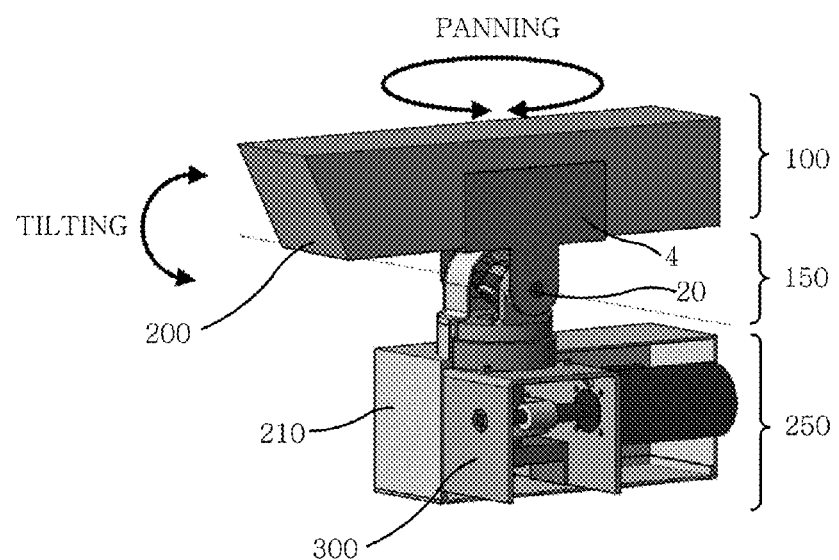
FIG. 1 is a perspective view illustrating a pan-tilt apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a pan-tilt apparatus for a surveillance camera according to embodiments of the present invention will be described with reference to the accompanying drawings.

A pan-tilt apparatus for a surveillance camera according to an embodiment of the present invention may include: an image capturing unit 100 including a camera 2 and a camera holder 4 for supporting the camera 2; a motion converter 150 including a driving shaft 10, a shaft 20 being connected to a connector 14 that is inserted into the driving shaft 10, a base member 30 being inserted into one side of the driving shaft 10 and of which both ends are inserted into the shaft 20 by including a bearing 24, a bearing 32 being installed in a lower portion of the base member 30 to smoothen an operation of the base member 30, a first worm 50 being inserted into the base member 30 and being mutually connected with a first worm gear 40, and a second worm 52 being inserted into the driving shaft 10 and being mutually connected with a second worm gear 42 to rotate; and a driving unit 250 including a first motor 80 and a second motor 82 being respectively connected to a first motor shaft 60 and a second motor shaft 62 that are inserted into the first worm gear 40 and the second worm gear 42, respectively, As shown in FIG. 1, the pan-tilt apparatus for the surveillance camera may include the image capturing unit 100, the motion converter 150, and the driving unit 250.

The image capturing unit 100 may include the camera 2 and the camera holder 4 for supporting the camera 2. Both ends of the camera holder 4 may be inserted into the shaft 20 of the motion converter 150 for panning and tilting.

As shown in FIG. 2 through FIG. 5, the motion converter 150 may include the driving shaft 10, the shaft 20 being connected to the connector 14 that is inserted into the driving shaft 10, the base member 30 being inserted into one side of the driving shaft 10 and of which both ends are inserted into the shaft 20 by including the bearing 24, the bearing 32 being installed in the lower portion of the base member 30 to smoothen an operation of the base member 30, the first worm 50 being inserted into the base member 30 and being mutually connected with the first worm gear 42 to rotate, and the second worm 52 being inserted into the driving shaft 10 and being mutually connected with the second worm gear 42 to rotate.

Figure 2:
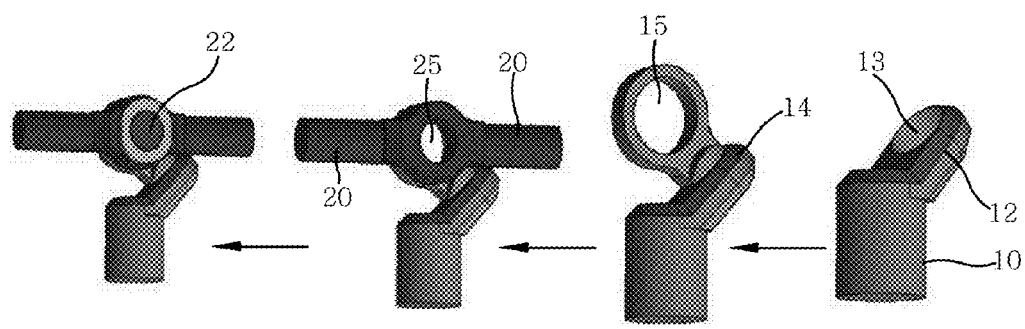
FIG. 2 and FIG. 3 are perspective views illustrating connection relationship between a driving shaft that is a major component of the present invention and a base member.
Figure 3:
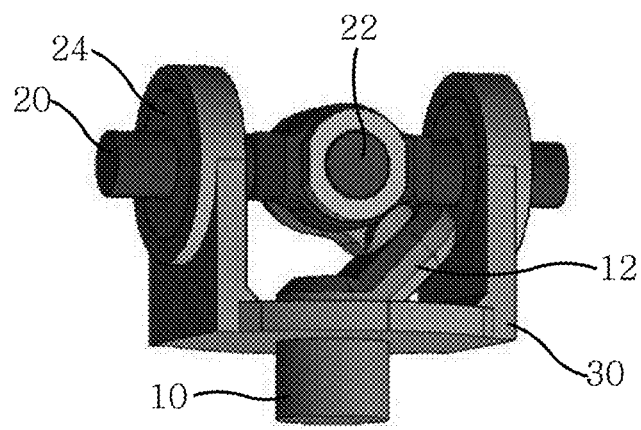

As shown in FIG. 2 and FIG. 3, a slope 12 may be formed on one side of the driving shaft 10 and a through hole 13 may be formed in the slope 12. The connector 14 may be inserted into the through hole 13. A through hole 15 may also be formed in the connector 14. The connector 14 and the shaft 20 may be connected to each other by matching the through hole 15 of the connector 14 and a through hole 25 of the shaft 20 and by inserting a pin 22 into the matched through holes 15 and 25. The bearings 24 may be installed in both ends of the shaft 20 at a predetermined interval.

Figure 4:
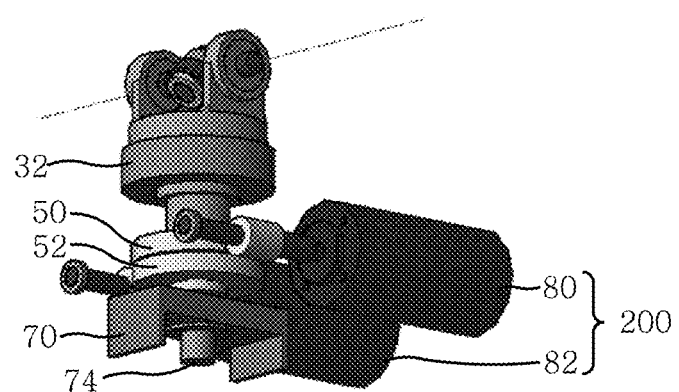
FIG. 4 and FIG. 5 are perspective views illustrating a motion conversion means that is a major component of the present invention.
Figure 5:
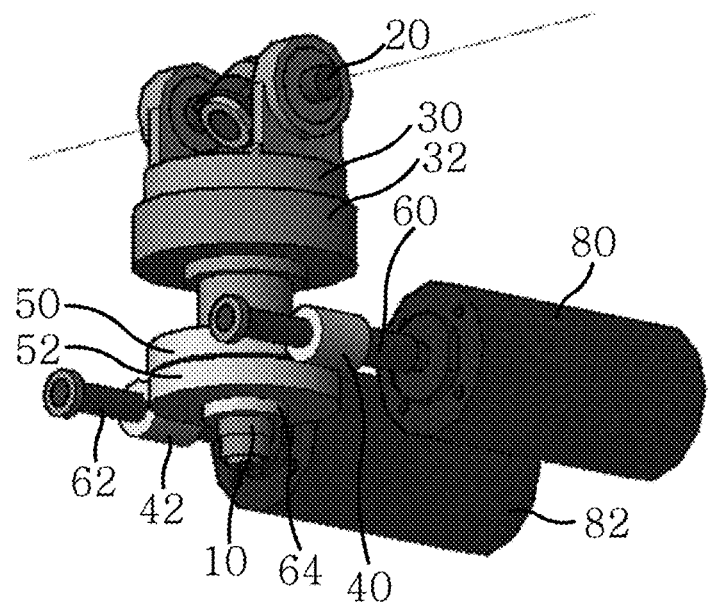

As shown in FIG. 2 and FIG. 3, one side of the base member 30 may be inserted into the driving shaft 10 and both ends of the base member 30 may be inserted into the bearings 24 inserted into the shaft 20. That is, the bearing 24 inserted into the shaft 20 may be installed in each of through holes (not shown) formed in both ends of the base member 30. As shown in FIG. 4 and FIG. 5, the bearing 32 may be disposed in the lower portion of the base member 30 to smoothen the operation of the base member 30. However, at least one bearing 32 may be installed depending on a user's requirement and other member such as a joint and the like may be installed. The plurality of first and second worms 50 and 52 to be inserted into the base member 30 or the driving shaft 10 may be disposed in the lower portion of the bearing 32. The first and second worms 50 and 52 may be meshed with the first and second worm gears 40 and 42 inserted into the first and second motors 80 and 82, respectively.

As shown in FIG. 4 and FIG. 5, the driving unit 250 may include the first and second motors 80 and 82 and the first and second motor shafts 60 and 62 that re connected to the first and second motors 80 and 82, respectively.

Figure 6:
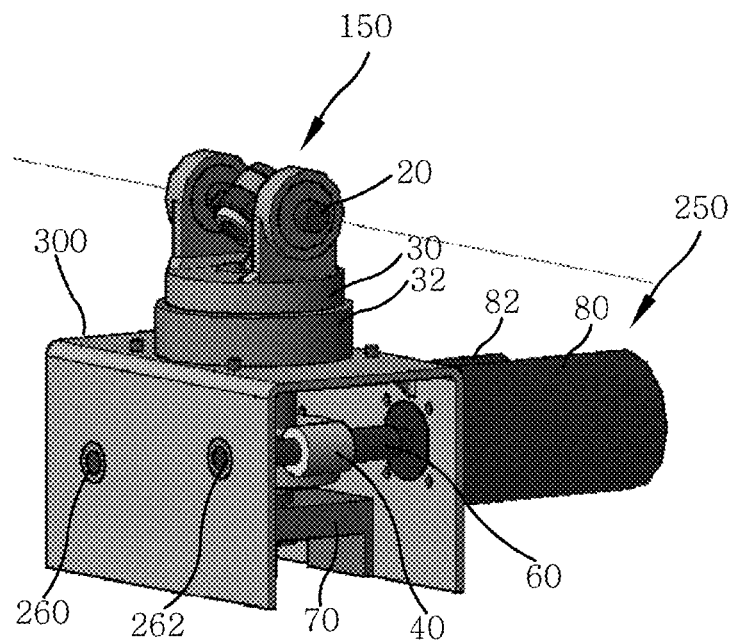
FIG. 6 is a perspective view illustrating a state in which a motion converter and a driving unit are connected to each other.

The first and second worm gears 40 and 42 may be inserted into predetermined portions of the first and second motors shafts 60 and 62, respectively. Here, the first and second worm gears 40 and 42 may be meshed with the first and second worms 50 and 52, respectively. Ends of the first and second motor shafts 60 and 62 may be mounted to a frame 300 to be rotatable by bearings 260 and 262 (see FIG. 6). The frame 300 may be combined by a fastener (not shown). In FIG. 1, not-described reference numerals 200 and 210 denote a bracket and an auxiliary bracket that function as a housing.

Meanwhile, a bearing 64 inserted into the driving shaft 10 may be installed below the first and second worms 50 and 52. Also, an auxiliary frame 70 may be further installed in the lower portion of the motion converter 150, that is, a portion at which the bearing 64 is to be installed. A slip ring 74 may be mounted to the driving shaft 10 to verify a position of each of a panning motion and a tilting motion within the auxiliary frame 70.

Hereinafter, an operation of the pan-tilt apparatus for the surveillance camera constructed as above will be described.

Figure 9:
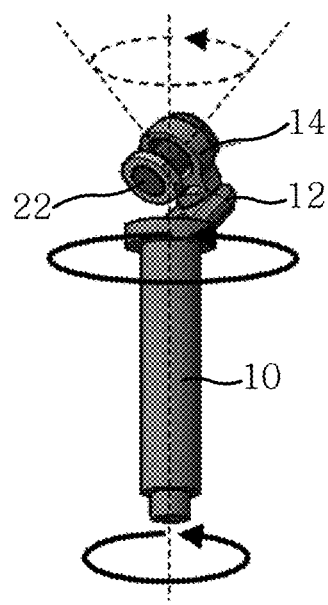
FIG. 9 is a view to describe a basic concept of the motion conversion means of the present invention.

When the first motor 80 of the driving unit 250 is driven, the first worm gear 40 inserted into the first motor shaft 60 may operate, which may be transferred to the base member 30 through the first worm 50 meshed with the first worm gear 40. The base member 30 may perform a rotary motion, that is, perform the panning motion. When the second motor 82 is driven, the second worm gear 42 inserted into the second motor shaft 62 may operate, which may be transferred to the shaft 10 through the second worm 52 meshed with the second worm gear 42. When the driving shaft 10 performs a rotary motion, the connector 14 connected to the slope 12 may perform a conical motion. The connector 14 is combined with the shaft 20 by means of the pin 22 and both ends of the shaft 20 are supported by the bearings 24 inserted with the base member 30. Therefore, when the connector 14 performs a conical motion, the connector 14 may rotate along the slope 12 from a virtual circular cone based on a hole center of the connector 14 or the driving shaft 10. When the driving shaft 10 rotates by 180 degrees, the slope 12 may be positioned to be on the opposite side and the hole center of the connector 14 may be positioned to be opposite to the virtual circular cone. In this instance, since the shaft 20 is connected to the connector 14 by the pin 22 and both ends of the shaft 20 are supported by the bearings 24, the bearings 24 may rotate based on the shaft. The connector 14 mounted to the slope 12 may perform a sliding motion. In the meantime, when the driving shaft 10 further rotates by another 180 degrees, the slope 12 may return to its original position and the shaft 20 may rotate into the opposite direction. As described above, while the driving shaft 10 rotates into one direction, the shaft 20 may perform a reciprocal rotary motion of repeating rotation and reverse rotation. The reciprocal rotary motion of the shaft 20 may be transferred to the camera holder 4, thereby enabling the camera 2 to perform a tilting motion (see FIG. 9).

Hereinafter, a pan-tilt apparatus for a surveillance camera according to another embodiment of the present invention will be described.

Figure 7:
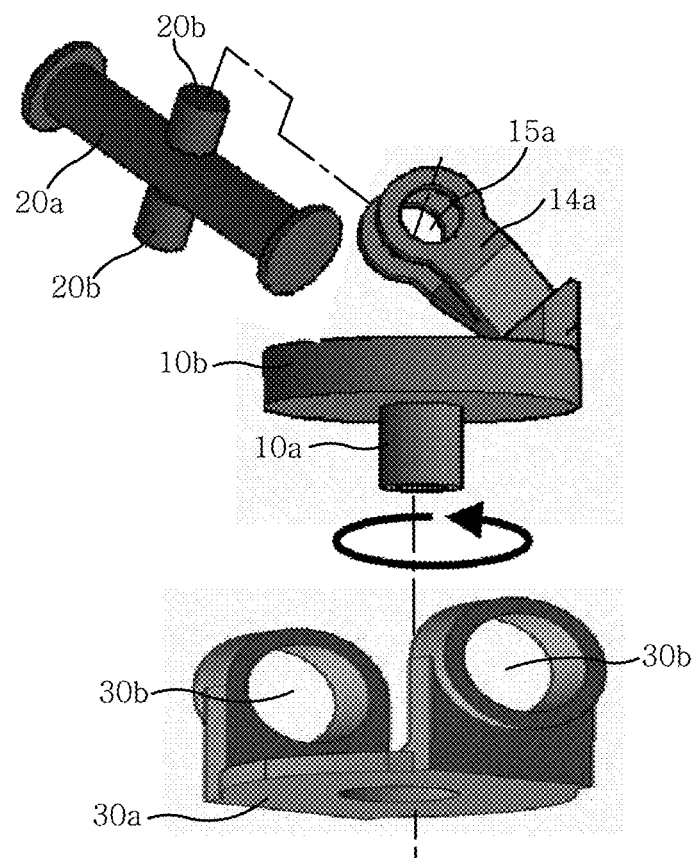
FIG. 7 and FIG. 8 are perspective views illustrating a motion conversion means according to another embodiment of the present invention.
Figure 8:
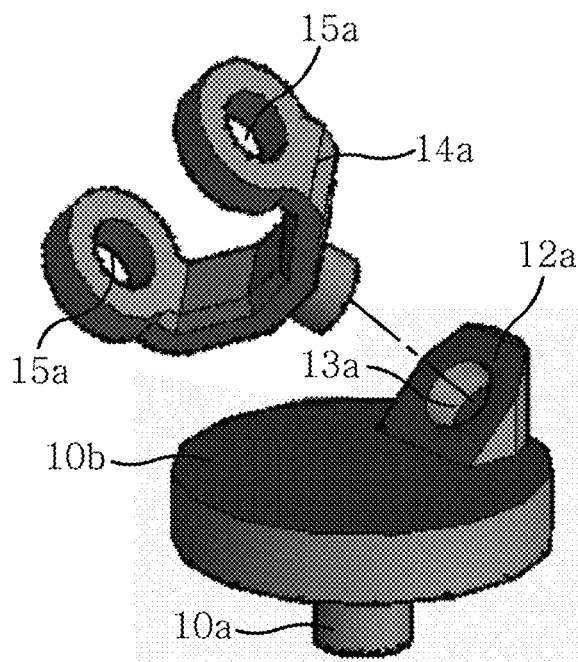

The pan-tilt apparatus for the surveillance camera may include: an image capturing unit 100 including a camera 2 and a camera holder 4 for supporting the camera 2; a motion converter 150 including a driving shaft 10*a*, a shaft 20*a* being connected to a C-type connector 14*a* that is inserted into the driving shaft 10*a*, a base member 30*a* being inserted into one side of the driving shaft 10*a* and of which both ends are inserted into the shaft 20*a*, and first and second worms 50 and 52 being inserted into the base member 30*a* and being mutually connected with first and second worm gears 40 and 42 to rotate; and a driving unit 250 including first and second motors 80 and 82 being respectively connected to first and second motor shafts 60 and 62 that are inserted into the first worm gear and the second worm gear 40 and 42, respectively, In particular, according to another embodiment of the present invention, as shown in FIG. 7 and FIG. 8, the motion converter 150 may include the driving shaft 10*a*, the shaft 20*a* being connected to the C-type connector 14*a* that is inserted into a slope 12*a* of the driving shaft 10*a*, the base member 30*a* being inserted into one side of the driving shaft 10*a* and of which both ends are inserted into the shaft 20*a*, a bearing (not show, but is configured to be nearly the same as the aforementioned embodiment) being installed in a lower portion of the base member 30a to smoothen an operation of the base member 30a, and the first and second worms 50 and 52 being inserted into the base member 30a and being mutually connected with the first and second worm gears 40 and 42 to rotate. Depending on a user requirement, the bearing may be used or may not be used.

The driving shaft 10a of the motion converter 150 may be connected to a disk portion 10b, and the slope 12a may be formed on one side of the disk portion 10b. A through hole 13a may be formed in one side of the slope 12a. The C-type connector 14a may be inserted into the through hole 13a. Through holes 15a may be formed in both ends of the C-type connector 14a. Protrusions 20b installed in both sides based on a center of the shaft 20a may be inserted into the through holes 15a of the C-type connector 14a. Both ends of the shaft 20a may be inserted into through holes 30b of the base member 30a. Both ends of the shaft 20a may be inserted into the through holes 30b of the base member 30a by include a bearing (not shown), which is similar to the aforementioned embodiment. The pan-tilt apparatus for the surveillance camera according to another embodiment of the present invention may be configured to be the same or similar to the aforementioned embodiment, except for the motion converter.

Hereinafter, an operation of the pan-tilt apparatus for the surveillance camera according to another embodiment of the present invention will be described.

The driving shaft 10a may be applied instead of the driving shaft 10 of the above-described embodiment, the disk portion 10b in a circular disk shape may be applied, and the slope 12a may be configured to be similar to the aforementioned embodiment. The C-type connector 14a may be applied instead of the connector 14, the protrusions 20b may be formed on the center of the shaft 20a, and the protrusions 20b may be connected to the C-type connector 14a. Here, the protrusions 20b may be integrally formed with the shaft 20a and may also be formed separate from the shaft 20a. The protrusions 20b may perform the same functionality as the pin 22 of the aforementioned embodiment.

Also, even though bearings (reference numeral 24 of the aforementioned embodiment) are not applied to both ends of the shaft 20a, the bearings may be installed depending on a user requirement. Both ends of the shaft 20a may be configured to be inserted into the base member 30a.

Only configurations of the driving shaft 10a, the C-type connector 14a, and the shaft 20a may be different from the aforementioned embodiment and a remaining operation is the same as the aforementioned embodiment. Accordingly, the operation may be sufficiently understood from the aforementioned embodiment.

Figure 10:
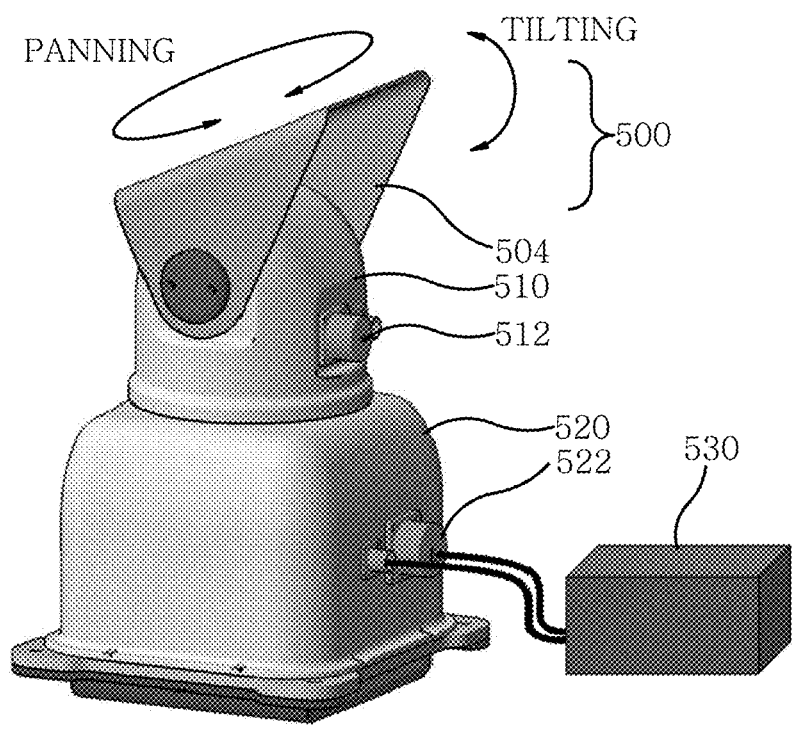
FIG. 10 is a perspective view illustrating still another embodiment of the present invention.

As shown in FIG. 10, a pan-tilt apparatus for a surveillance camera according to still another embodiment of the present invention may include a support portion 500, an upper cover 510 being installed with an upper connector 512, a lower cover 520 being installed with a plurality of lower connectors 522, and a pan-tilt controller 530. However, substantial constituent components of the pan-tilt apparatus may include the support portion 500, a motion converter 800, and a driving unit 900.

Various targets desired to be inspected, checked, and measured, such as a camera, a scanner, and a gun type, may be installed in a holder 504 of the support portion 500 using a separate bracket (not shown).

Figure 11:
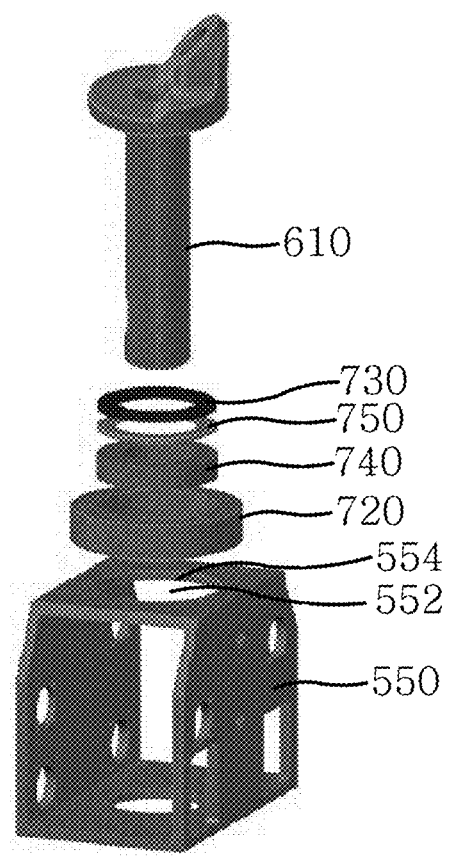
FIG. 11 is a perspective view illustrating a state in which a driving shaft that is a major component of the present invention is connected to a bracket.
Figure 12:
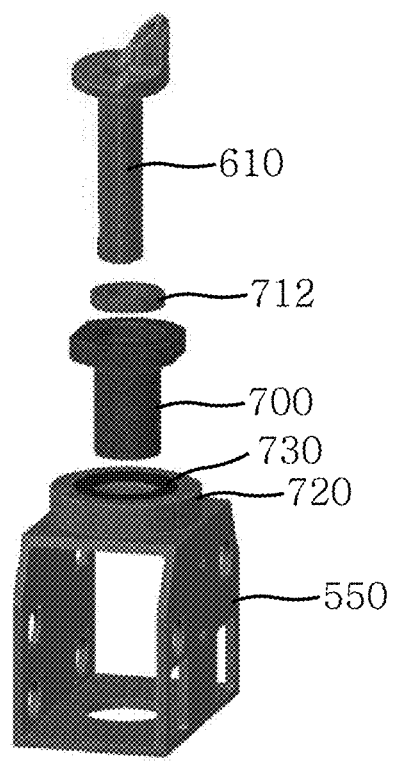
FIG. 12 is a perspective view illustrating connection relationship between a driving shaft that is a major component of the present invention and a panning shaft.
Figure 13:
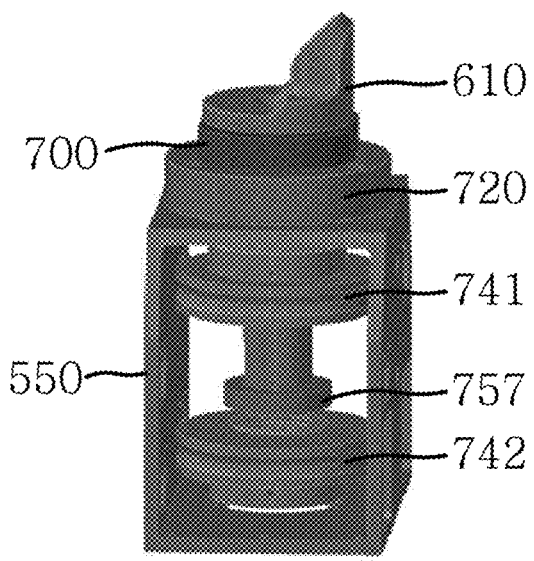
FIG. 13 is a perspective view illustrating a plurality of worms that are major components of the present invention.

As shown in FIG. 11 and FIG. 12, a driving shaft 610 having a slope 612 may be installed in an upper center of a bracket 550 and the driving shaft 610 may be inserted into a panning shaft 700 by including a bearing 712. The bearing 712 may be a driving bearing and be inserted into an upper portion of the panning shaft 700. That is, the bearing 712 may be a bearing for the tilting driving shaft 610. As shown in FIG. 13, the driving shaft 610 may be inserted with a second worm 742 and a bearing 757 in the lower portion of the driving shaft 610 to receive a rotary motion of a second motor 882 (see FIG. 18).

The panning shaft 700 may sequentially insert a thrust bearing 730, a spacer 750, and a bearing 740 into a bearing frame 720. A number of the bearings 712, 730, and 740 may be changed based on the user requirement. The bearing frame 720 may be received in a through hole 552 formed with a short step 554 that is internally formed in an upper portion of the bracket 550.

Figure 14:
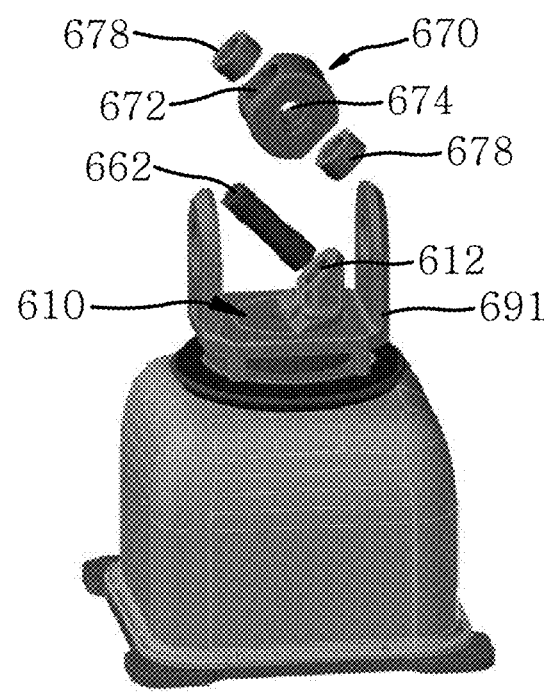
FIG. 14 and FIG. 15 are perspective views illustrating connection relationship between a driving shaft that is a major component of the present invention and a connection shaft.
Figure 15:
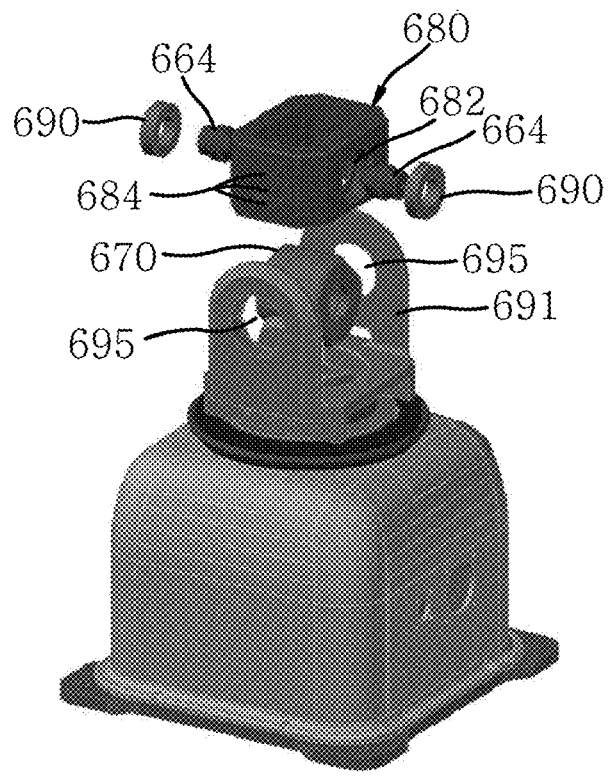

As shown in FIG. 14 and FIG. 15, a driving member 670 may be installed within an inside of a U-type base member 691. Through holes 672 may be formed in one side of the driving member 670 to be inserted with bearings 678 each including a shaft 662. A hole 671 for inserting a connection pin 664 may be formed in another side of the driving member 670. A through hole 682 may be formed in one side of a connection shaft 680 to be inserted with the connection pin 664, and a protrusion 684 may be formed in another side of the connection shaft 680. A bearing 690 may be inserted into the connection pin 664.

Figure 16:
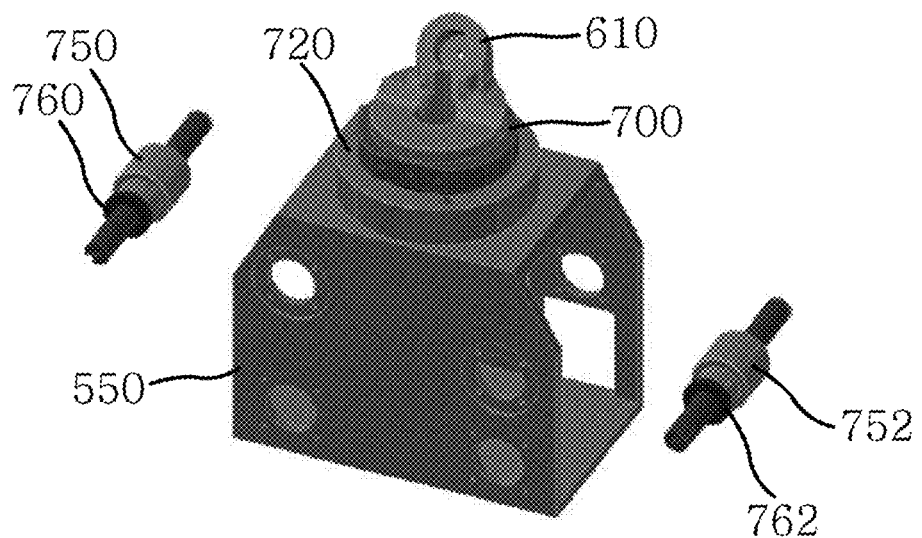
FIG. 16 through FIG. 19 are perspective views illustrating connection relationship between worm that is a major component of the present invention and a worm gear.
Figure 17:
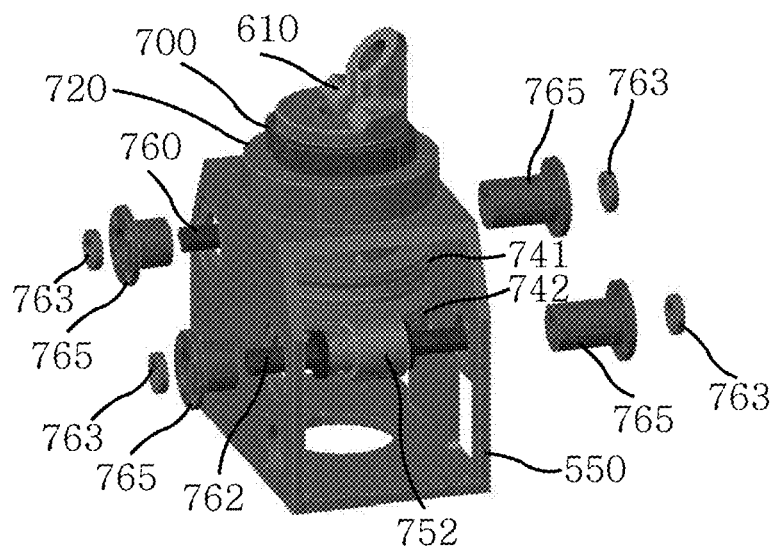

For a smooth rotation of the panning shaft 700, a plurality of bearings 730 and 740 may be inserted into the bearing frame 720, and the first and second worms 741 and 742 may be inserted into the panning shaft 700 and the driving shaft 610, respectively. That is, the first worm 741 may be inserted into the panning shaft 700 and the second worm 742 may be inserted into the driving shaft 610. As shown in FIG. 13, FIG. 16, and FIG. 17, the first and second worms 741 and 742 may be screw combined with first and second worm gear gears 750 and 752 inserted into first and second worm shafts 760 and 762, respectively. The first and second worm shafts 760 and 762 may be inserted into a bearing frame 765 including a bearing 763 in each of both sides.

Figure 18:
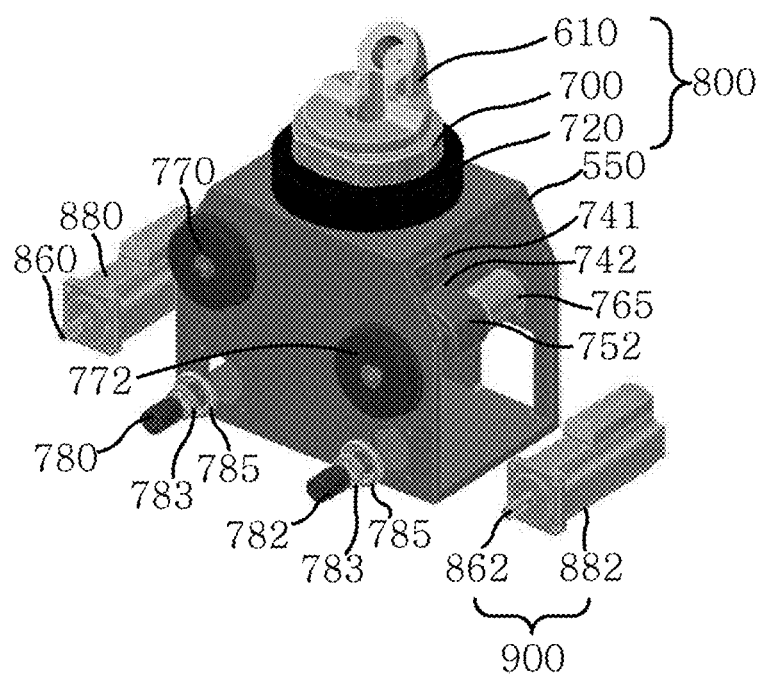
Figure 19:
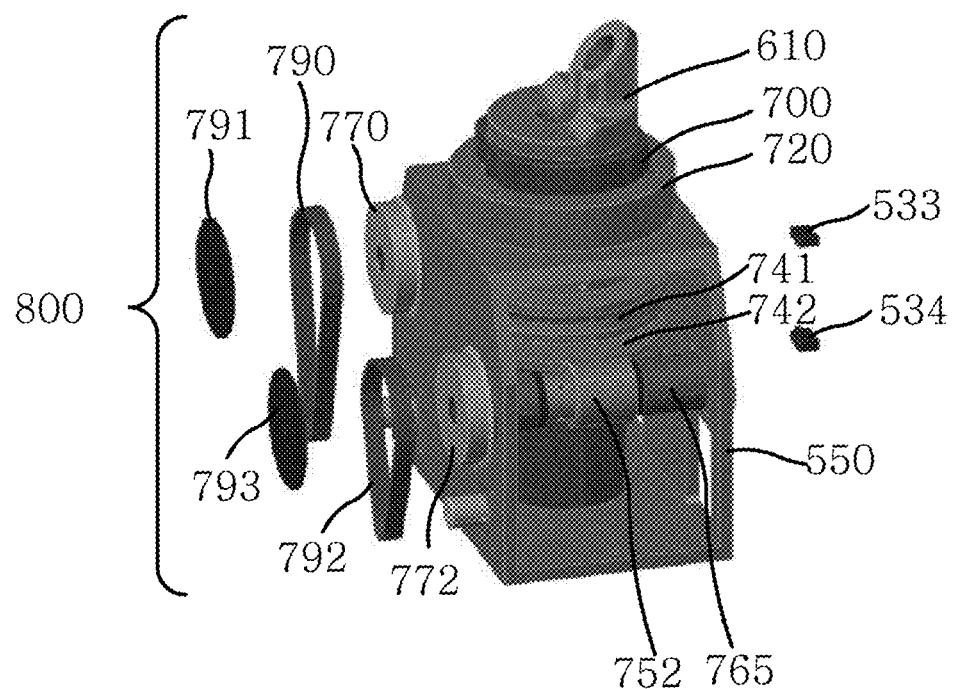

As shown in FIG. 17 and FIG. 18, first and second upper pulleys 770 and 772 may be inserted into the first and second worm shafts 760 and 762, respectively, and first and second lower pulleys 780 and 782 may be mutually connected with the first and second upper pulleys 770 and 772 by including first and second belts 790 and 792, respectively. First and second upper caps 791 and 793 may be inserted into the first and second upper pulleys 700 and 772, respectively. The first and second lower pulleys 780 and 782 may also be inserted into a bearing frame 785 by including a bearing 783.

The driving unit 900 may include first and second motors 880 and 882, and first and second motor shafts 860 and 862 of the first and second motors 880 and 882 may be inserted into the first and second lower pulleys 780 and 782, respectively, through the bearing frame 785 including the bearing 783.

Figure 20:
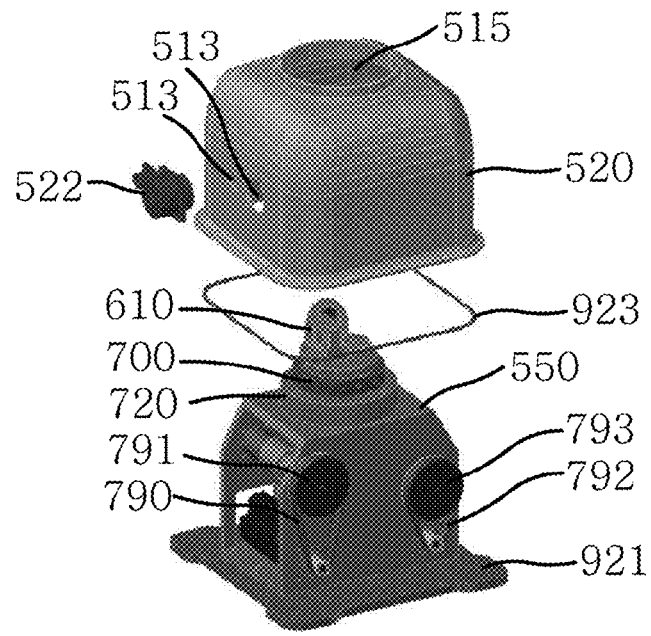
FIG. 20 and FIG. 21 are perspective views illustrating combination relationship between a motion conversion means that is a major component of the present invention and a lower cover.

As shown in FIG. 20, the bracket 550 installed with the motion converter 800 and the driving unit 900 may be received in a base plate 921. The lower cover 520 may be assembled to the base plate 921 by including an O-ring 923. A plurality of lower connectors 522 may be inserted into a plurality of through holes 513 formed in one side of the lower cover 520. In FIG. 20, a not-described reference numeral 515 corresponds to a central hole formed in the center of the lower cover 520.

Figure 21:
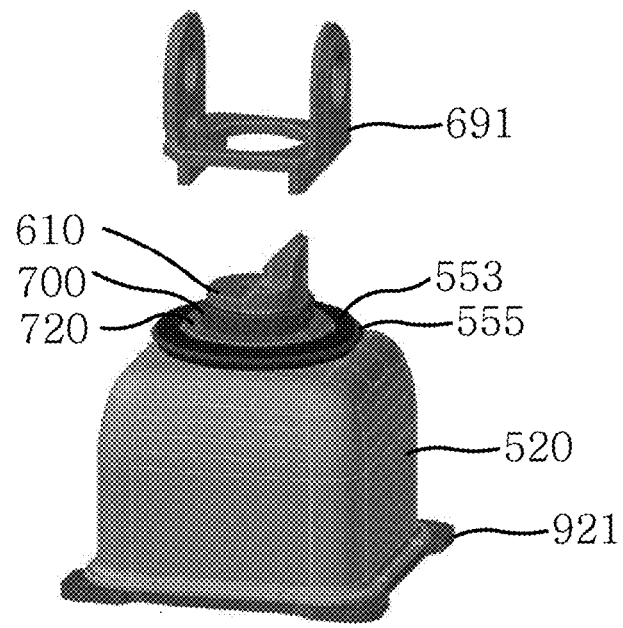

As shown in FIG. 21, the U-type base member 691 may be connected to the upper portion of the lower cover 520 in a state where a retainer 553 and an O-ring 555 are inserted. The protrusion 684 of the connection shaft 680 may be inserted into a through hole 695 formed in each of both sides of the U-type base member 691. The retainer 553 and the O-ring 555 may be installed to prevent rust occurring due to external humidity or humidity. The driving shaft 610 may be mounted to the U-type base member 691 and the upper cover 510 may be assembled to the upper portion of the U-type base member 691. The upper cover 510 may be installed to protect the driving member 670, the connection shaft 680, and the like, from snow, rain, and due, and the upper connector 512 may be installed for camera control. The lower connector 522 may be installed in the lower cover 520, and the lower connector 522 may be connected to the pan-tilt controller 530 for pan-tilt control. Hereinafter, an operation of the pan-tilt apparatus constructed as above will be described.

Initially, as shown in FIG. 18, when the first and/or second motors 880 and 882 are driven, the first lower pulley 780 connected to the first motor shaft 860 of the first motor 880 and the first upper pulley 770 connected to the first belt 790 may rotate. In this instance, when the first worm shaft 760 connected to the first upper pulley 770 rotates, the first worm gear 750 installed in the first worm shaft 760 may also rotate. When the first worm gear 750 rotates, the first worm 741 may also rotate. When the panning shaft 700 rotates by rotation of the first worm 741, the upper cover 510 connected to the panning shaft 700 may perform a panning motion whereby the holder 504 may also perform the panning motion.

In the meantime, the second lower pulley 782 connected to the second motor shaft 862 of the second motor 882 and the second upper pulley 772 connected to the second belt 792 may rotate. In this instance, when the second worm shaft 762 connected to the second upper pulley 772 rotates, the second worm gear 752 installed in the second worm shaft 762 may also rotate. When the second worm gear 752 rotates, the second worm 742 may also rotate. In this instance, when the second worm 742 rotates, the driving shaft 610 may also rotate. When the driving shaft 610 performs a rotary motion, an axial center of the shaft 662 connected to the slope 612 of the driving shaft 610 may perform a conical motion. As shown in FIG. 14, the rotary motion of the driving shaft 610 may generate the conical motion of the shaft 622 and the driving member 670. As shown in FIG. 15, the conical motion of the driving member 670 may generate a reciprocal rotary motion of the connection shaft 680 by employing the connection pin 664 as a rotation axis. Accordingly, the reciprocal rotary motion of the connection shaft 680 enables the holder 504 to perform a tilting motion through the connection pin 697.

Figure 29:
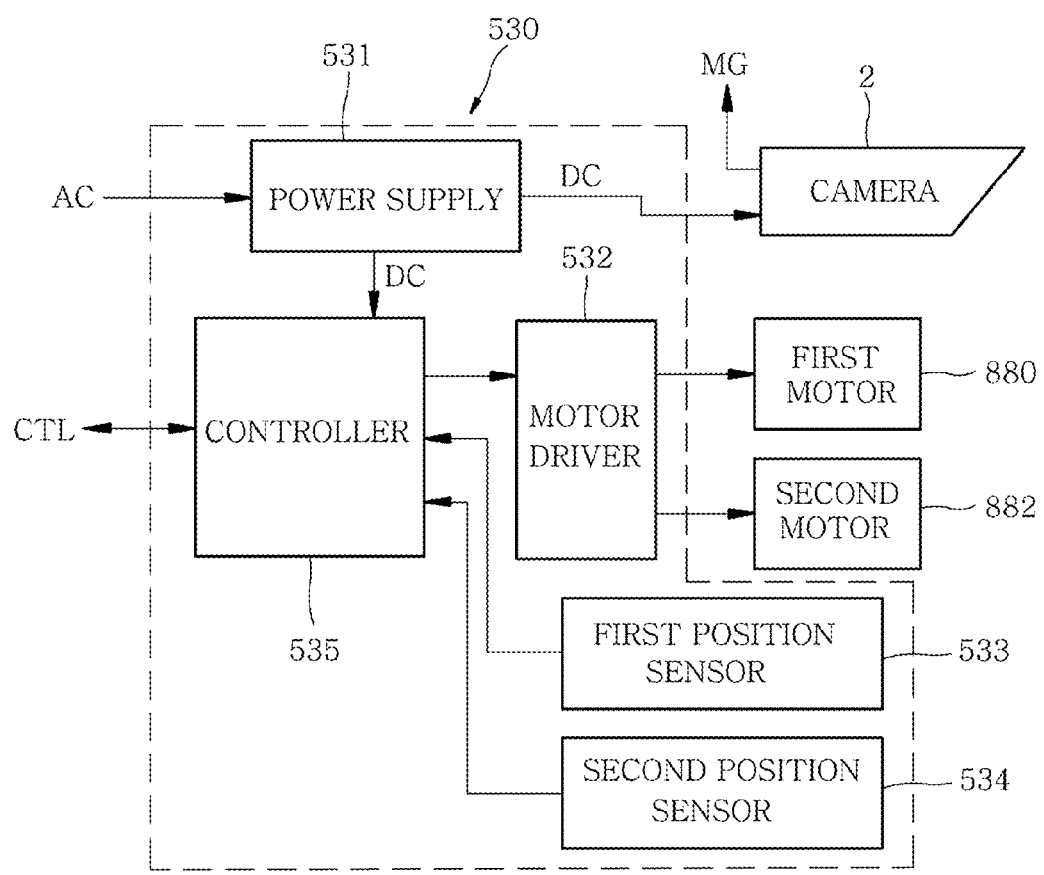
FIG. 29 is a block diagram illustrating a configuration of a pan-tilt controller according to the present invention.

As shown in FIG. 10 and FIG. 29, the pan-tilt controller 530 may be provided to the pan-tilt apparatus for panning or tilting the holder 504 mounted to the support portion 500. The pan-tilt controller 530 may be connected to the driving unit 900 and may control the first and second motors 880 and 882 so that the support portion 500 may perform a panning motion or a tilting motion by means of the motion converter 800. As shown in FIG. 29, the pan-tilt controller 530 may include a power supply 531, a motor driver 532, first and second position sensors 533 and 534, and a controller 535.

The power supply 531 may be supplied with an alternating current (AC) from an outside to convert the AC to a direct current (DC), and may supply the converted DC to the controller 535 or the camera 2 installed in the support portion 500. Image information MG photographed at the camera 2 may be directly transferred to a host computer (not shown) that is connected to the pan-tilt controller 530 without using the pan-tilt controller 530. The motor driver 532 may selectively receive first and second motor control signals to drive the first and second motors 880 and 882 of the driving unit 900 so that the support portion 500 may perform the panning motion or tilting motion by means of the motion converter 800. The first and second position sensors 533 and 534 may be installed in the bracket 550 to be adjacent to the first and second worms 741 and 742 of the motion converter 800, respectively, and thereby sense rotation positions of the first and second worms 741 and 742 to output sensed position signals.

The controller 535 may be supplied with the DC output from the power supply 531 and receive the sensed position signals output from the first and second position sensors 533 and 534 to thereby determine a position of the support portion 500. That is, the controller 535 may receive the sensed position signal output from each of the first and second position sensors 533 and 534 to determine a panning motion angle or a tilting motion angle of the holder 504 of the support portion 500. When the position of the support portion 500 is determined, the controller 535 may receive an external control signal CTL to determine whether the external control signal CTL corresponds to an active mode or a standby mode, and may generate and selectively output first and second motor control signals for the panning motion or the tilting motion of the support portion 500. For example, in the standby mode, the controller 535 may sequentially output the first and second motor control signals at a predetermined time interval and thereby enables the support portion 500 to be panned and then be tilted, or to be tilted and then be panned. Conversely, in the active mode, the controller 535 may generate the first and second motor control signals for a relatively shorter time difference than the standby mode and thereby enables the support portion 500 to be simultaneously panned and tilted. Accordingly, the controller 535 enables the support portion 500 to be relatively quickly positioned at a desired position.

Hereinafter, a pan-tilt apparatus according to still another embodiment of the present invention will be described with reference to FIG. 22 through FIG. 27.

Side walls 1005 may be formed on both sides of a support body 1000 of the pan-tilt apparatus, and through holes 1007 may be formed in the side walls 1005. A separation wall 1010 having a plurality of through holes 1002 may be installed within the side walls 1005.

Figure 24:
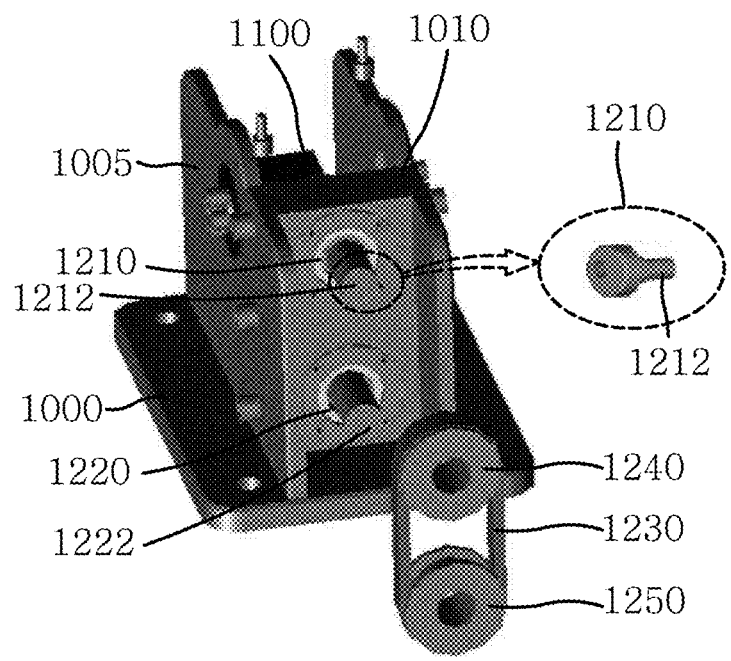
FIG. 24 is a perspective view illustrating connection relationship between a driving member that is a major component of the present invention and a pulley.

Bearings 1232 and 1234 may be inserted into the through holes 1002, respectively. A shaft 1212 of a driving member 1210 may be inserted into the bearing 1232, and a shaft 1222 of a driving member 1220 inserted into a shaft 1111 of a motor 1100 may be inserted into the bearing 1234. As shown in FIG. 24, first and second pulleys 1240 and 1250 may be connected to the shafts 1212 and 1222 of the driving members 1210 and 1220, respectively, by including a belt 1230.

Figure 22:
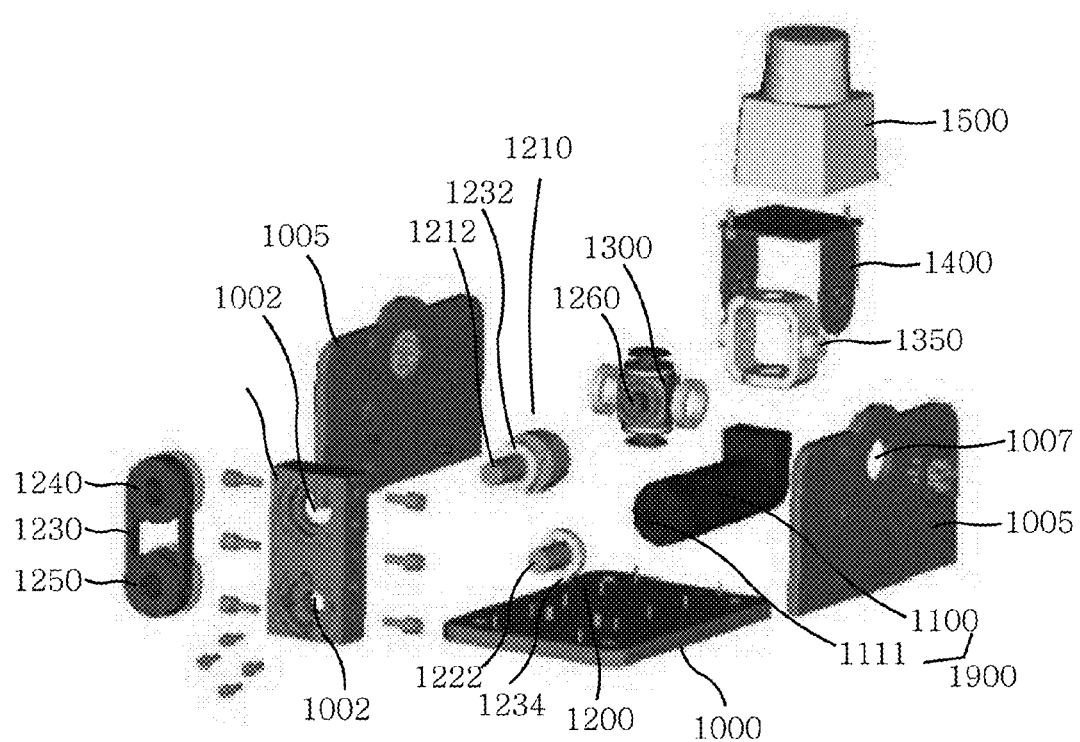
FIG. 22 is an exploded perspective illustrating still another embodiment of the present invention.
Figure 23:
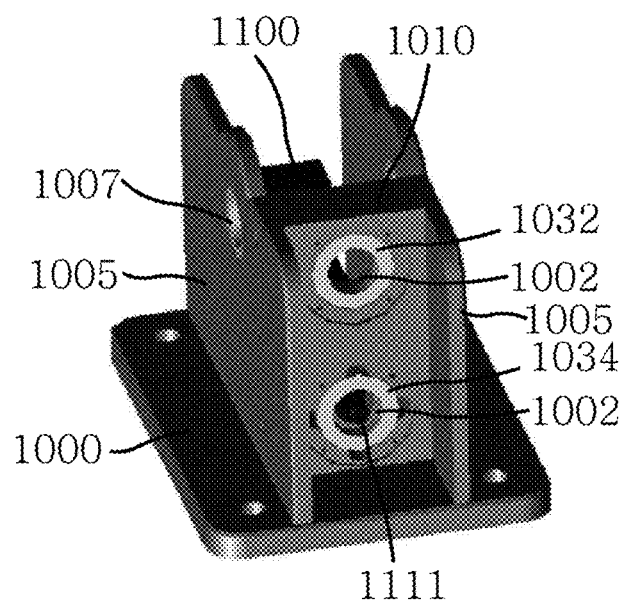
FIG. 23 is a perspective view illustrating a support body that is a major component of the present invention.
Figure 25:
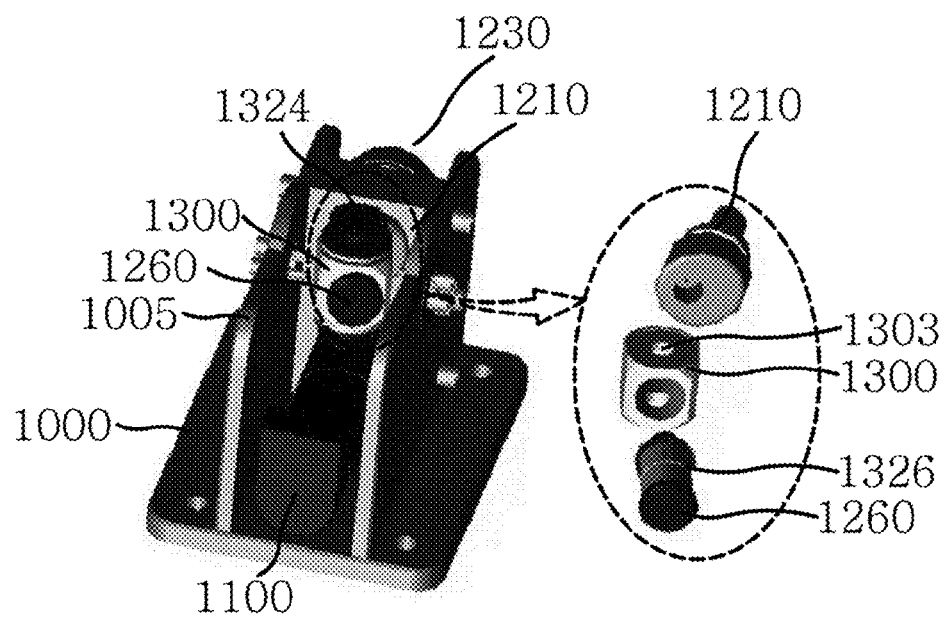
FIG. 25 through FIG. 27 are perspective views illustrating connection relationship of an auxiliary driving shaft that is a major component of the present invention, a connection shaft, and a bracket.

An auxiliary driving member 1300 may be mutually connected with a rear portion (not shown) of the driving member 1210 using a pin 1260 (see FIG. 22). As shown in FIG. 25, the auxiliary driving member 1300 may be connected to the driving member 1210 by including an auxiliary bearing 1326 and the pin 1260. The auxiliary bearing 1326 may not be used depending on a user requirement. The pins 1324 may be inserted into upper and lower portions of the driving member 1210 by including the bearings 1320.

Figure 26:
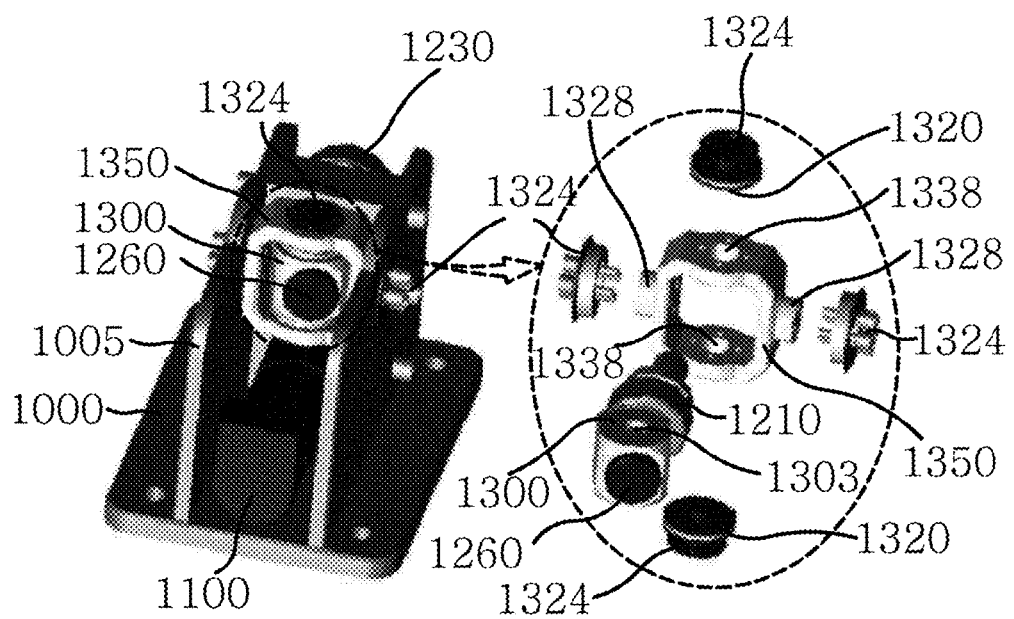
Figure 27:
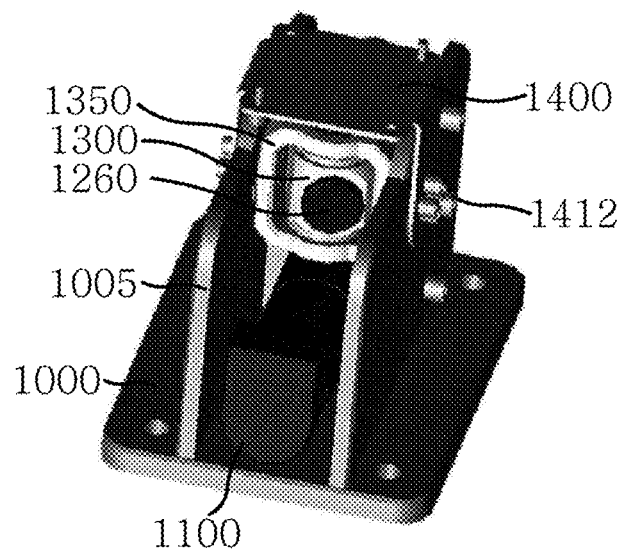
Figure 28:
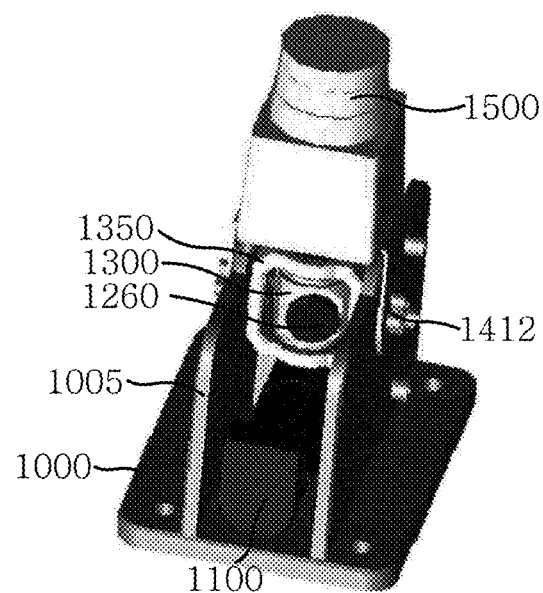
FIG. 28 is a perspective view illustrating an assembly state according to still another embodiment of the present invention.

As shown in FIG. 26, protrusions 1328 may be formed on both sides of the connection shaft 1350. Through holes 1338 may be formed in both sides orthogonal to the protrusions 1328, and the auxiliary driving member 1300 may be inserted therein. The protrusions 1328 may be rotatably inserted into the through holes 1007 of the side walls 1005. The through hole 1338 of the connection shaft 1350 and a through hole 1303 of the auxiliary driving shaft 1300 may be mutually connected with each other by means of the pin 1324 by including the bearing 1320. As shown in FIG. 27 and FIG. 28, a bracket 1400 for installing a camera and a sensor 1500 may be installed in an upper portion of the connection shaft 1350. The bracket 1400 may be fixed to the side walls 1005 of the support body 1000 by means of a plurality of screws 1412.

Hereinafter, an operation of the pan-tilt apparatus according to still another embodiment of the present invention constructed as above will be described.

When the motor 1100 mounted to the support body 1000 is driven, the shaft 1111 of the motor 1100 may rotate and the shaft 1222 connected to the shaft 1111 may rotate. The shaft 1222 may be mutually connected with the shaft 1212 by inserting a plurality of pulleys 1240 and 1250 and by the belt 1230. Therefore, the shaft rotation may rotate the belt 1230. Since the shaft 1212 is connected to the pin 1260 of the auxiliary driving member 1300, the shaft 1212 may perform a conical motion based on an axial center (not shown) of the pin 1260 and the connection shaft 1350 may perform a reciprocal rotary motion. In this instance, the bracket 1400 installed in an upper portion of the connection shaft 1350 may also perform a reciprocal rotary motion and thus, the camera and the sensor 1500 installed in the upper portion of the bracket 1400 may also perform a reciprocal rotary motion.

Figure 30:
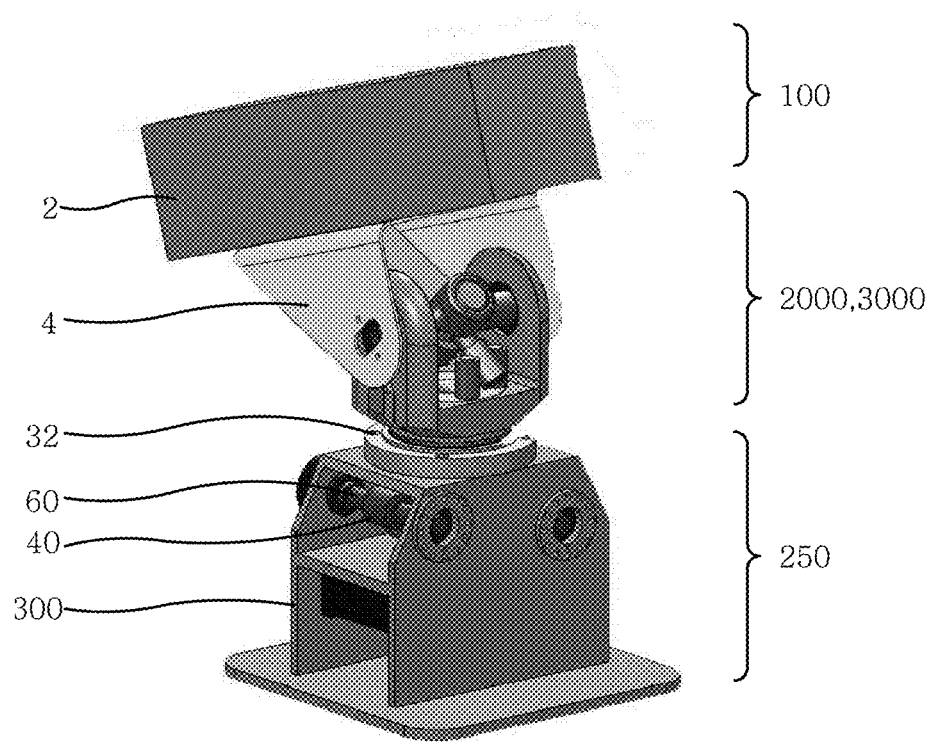
FIG. 30 is a view schematically illustrating still another embodiment of the present invention.

As shown in FIG. 30, a pan-tilt apparatus according to still another embodiment of the present invention may include an image capturing unit 100, a motion converter 2000, and a driving unit 250.

The image capturing unit 100 may include a camera 2 and a camera holder 4 for supporting the camera 2. The camera holder 4 may be inserted into both ends 2212 of a T-type tilting mechanism 2210 of the motion converter 2000 for panning and tilting.

Figure 31:
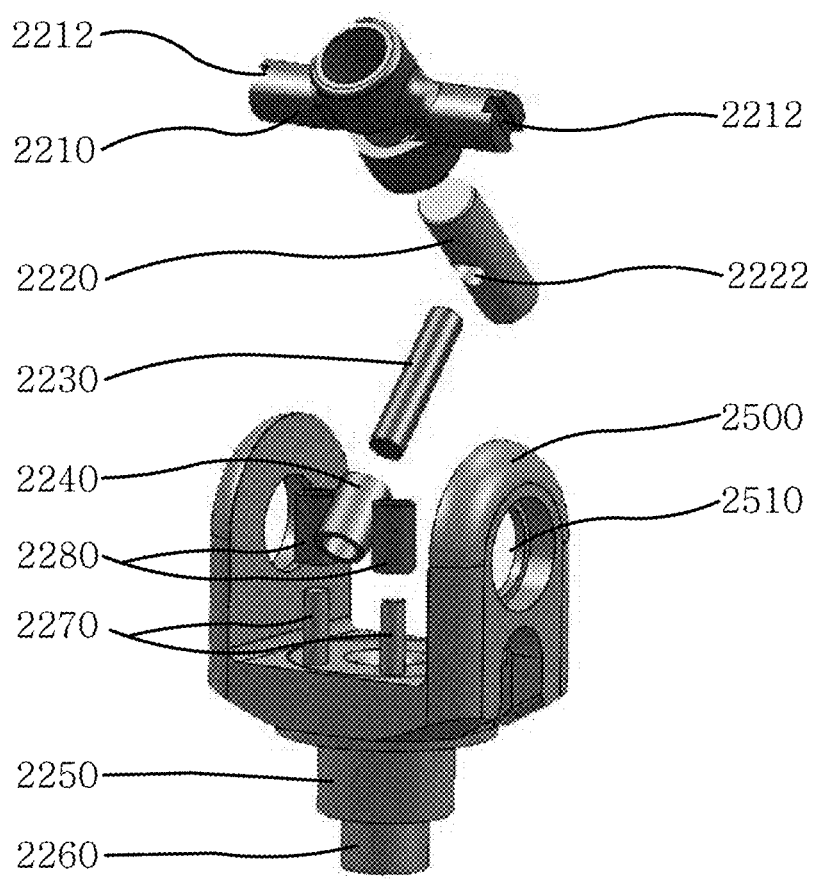
FIG. 31 is a perspective illustrating major components of a motion converter of FIG. 30.

As shown in FIG. 31, the motion converter 2000 may include a tilting shaft 2260, a panning shaft 2250 being inserted onto an outside of the tilting shaft 2260, a T-type tilting converter 2240 being inserted between a plurality of auxiliary shafts 2270 that is connected to the tilting shaft 2260, a T-type center mechanism 2220 being inserted into a connection pin 2230 that is inserted into the T-type tilting connector 2240, a T-type titling mechanism 2210 being connected to the T-type center mechanism 2220 and of which both ends 2212 are inserted into a base member 3000, and first and second worms 50 and 52 being inserted into the base member 2500 and being mutually connected with the first and second worm gears 40 and 42.

Even though a number of worm gears and a number of worms or various types of gears are generally applicable to the first and second worms 50 and 52 being mutually connected with the first and second worm gears 40 and 42 to rotate, an example similar to the aforementioned embodiment may be applied herein. Also, even though an example similar to the aforementioned embodiment is applied to the driving unit 250 including the first and second motors 80 and 82 being respectively connected to the first and second motors 60 and 62 to be inserted into the first and second worm gears 40 and 42, the driving unit 250 may be configured to have various types of configurations.

In the motion converter 2000, the plurality of auxiliary shafts 2270 may be inserted into the auxiliary connector 2280. The T-type tilting connector 2240 may be inserted between the plurality of auxiliary shafts 2270 connected to the tilting shaft 2260. One side of the connection pin 2230 may be inserted into the T-type tilting connector 2240 and another side of the connection pin 2230 may be inserted into a hole 2222 of the T-type center mechanism 2220.

The T-type center mechanism 2220 may be inserted into the T-type titling mechanism 2210 by a predetermined length. Here, the predetermined length indicates a length in which interference does not occur in the hole 2222 of the T-type center mechanism 2220 when the T-type center mechanism 2220 is to be inserted into the T-type tilting mechanism 2210. Both ends 2212 of the T-type tilting mechanism 2210 may be inserted into the base member 2500 in a state where the T-type center mechanism 2220 is inserted.

Meanwhile, a bearing 30 may be installed in a lower portion of the base member 2500 to smoothen an operation of the base member 2500, and the first and second worms 50 and 52 may be installed in the lower portion of the bearing 30 to be inserted with the base member 30. The first and second worms 50 and 52 may be meshed with the first and second worm gears 40 and 42 inserted into the first and second motors 80 and 82.

The driving unit 250 may include the first and second motors 80 and 82 and the first and second motor shafts 60 and 62 connected to the first and second motors 80 and 82.

The first and second worm gears 40 and 42 may be inserted into predetermined portions of the first and second motor shafts 60 and 62, respectively, and the first and second worm gears 40 and 42 may be meshed with the first and second worms 50 and 52, respectively. Ends of the first and second motor shafts 60 and 62 may be disposed to be rotatable by the bearings 260 and 262, respectively. The frame 300 may be combined by a combination member (not shown).

In the meantime, the bearing 64 inserted into the tilting shaft 2260 may be installed in the lower portion of the first and second worms 50 and 52. Also, an auxiliary frame 70 may be further installed in the lower portion of the motion converter 2000, that is, a portion in which the bearing 64 is installed. A slip ring 74 may be installed in the tilting shaft 2260 to verify a position of a panning motion and a position of a tilting motion within the auxiliary frame 70.

Hereinafter, an operation of a pan-tilt apparatus for a surveillance camera according to still another embodiment of the present invention will be described with reference to FIG. 32 through FIG. 34.

When the first motor 80 of the driving unit 250 is driven, the first worm gear 40 inserted into the first motor shaft 60 may operate, which may be transferred to the base member 2500 through the first worm 50 meshed with the first worm gear 40, whereby the base member 2500 may perform a rotary motion, that is, may perform a panning motion. When the second motor 82 is driven, the second worm gear 42 inserted into the second motor shaft 62 may operate, which may be transferred to the tilting shaft 2260 through the second worm 52 meshed with the second worm gear 42.

When the tilting shaft 2260 performs a rotary motion, the connection pin 2230 inserted into the T-type tilting connector 2240 that is disposed between the auxiliary shafts 2270 may perform a conical motion. In this instance, the T-type center mechanism 2220 may perform a left and right motion, that is, a horizontal motion. Here, the T-type tilting mechanism 210 may convert the horizontal motion to an orthogonal rotary motion, thereby generating an up and down motion, that is, vertical reciprocal rotary motion.

Figure 32:
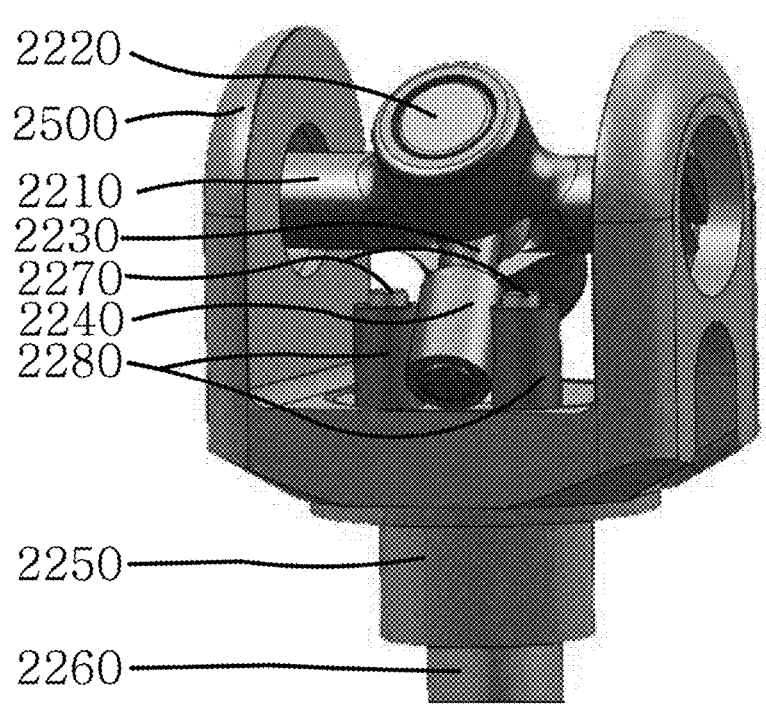
FIG. 32 through FIG. 34 are perspective views to describe operation relationship of FIG. 30.
Figure 33:
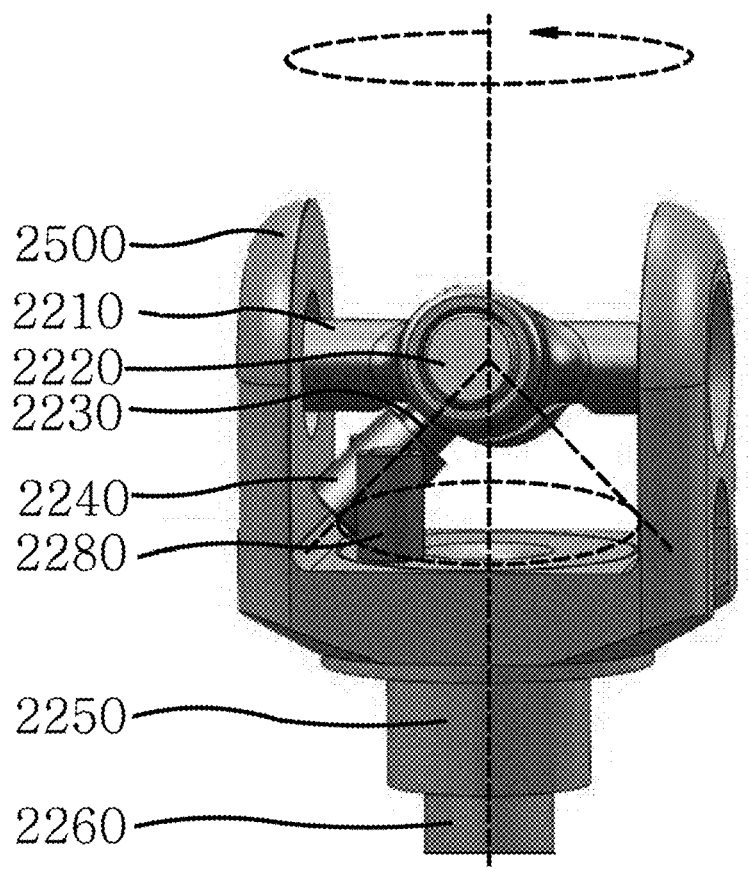
Figure 34:
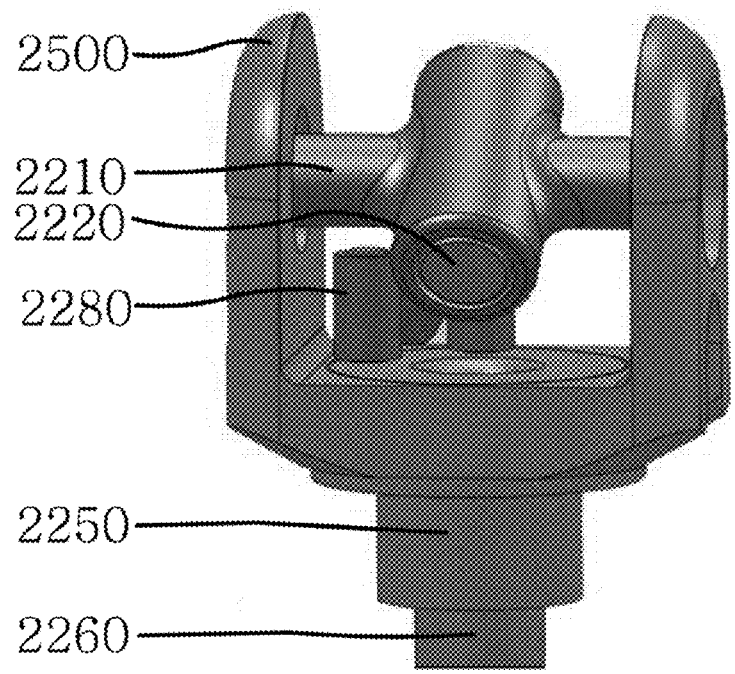

Specifically, as shown in FIG. 32 through FIG. 34, the T-type center mechanism 2220 may be connected to the connection pin 2230 inserted into the tilting connector 2240 and be inserted into the T-type tilting mechanism 2210 and thereby be connected thereto. When the tilting shaft 2260 rotates into one direction in a state of FIG. 32, The T-type tilting connector 2240 may also rotate into the same direction. As shown in FIG. 33, the connection pin 2230 may move along a side face of a virtual truncated cone. Since the connection pin 2230 is inserted into the T-type tilting mechanism 2210, the T-type center mechanism 2220 may perform a vertical reciprocal motion by the conical motion of the connection pin 2230.

When the tilting shaft 2260 rotates by about 90 degrees in a state of FIG. 32, the T-type tilting connector 2240 may be in a state of FIG. 33. Specifically, while the T-type tilting connector 2240 is moving towards the left side, the height of the connection pin 2230 may ascend whereby the height of the T-type tilting mechanism 2210 may also ascend.

When the tilting shaft 2260 further rotates by another 90 degrees in the state of FIG. 33, the T-type tilting connector 2240 may be in a state of FIG. 34.

The T-type center mechanism 2220 connected to the connection pin 2230 may continuously perform a horizontal motion and the T-type tilting mechanism 2210 may convert the horizontal motion of the T-type center mechanism 2220 to the orthogonal rotary motion, thereby generating the vertical reciprocal rotary motion.

In the meantime, since the T-type tilting mechanism 2210 is connected by the T-type center mechanism 2220 and both ends 2212 of the T-type tilting mechanism 2210 are inserted into the base member 2500, both ends 2212 thereof may rotate. Here, rotating of the both ends 2212 may indicate that since both ends 2212 of the T-type tilting mechanism 2210 are inserted into holes 2510 of the base member 2500 by including bearings (not shown), the bearings rotate instead of both ends 2212.

As described above, while the tilting shaft 2260 is rotating into one direction, the T-type tilting mechanism 2210 may perform a reciprocal rotary motion. The reciprocal rotary motion of the T-type tilting mechanism 2210 may be transferred to the camera holder 4, thereby enabling the camera 2 to perform a tilting motion.

In the pan-tilt apparatus for the surveillance camera according to the present embodiment, the image capturing unit 100 and the driving unit 250 may be similar to the aforementioned embodiment. Only the motion converter 2000 may be different from the aforementioned embodiment and thus, the motion converter 2000 will be described in detail.

Figure 35:
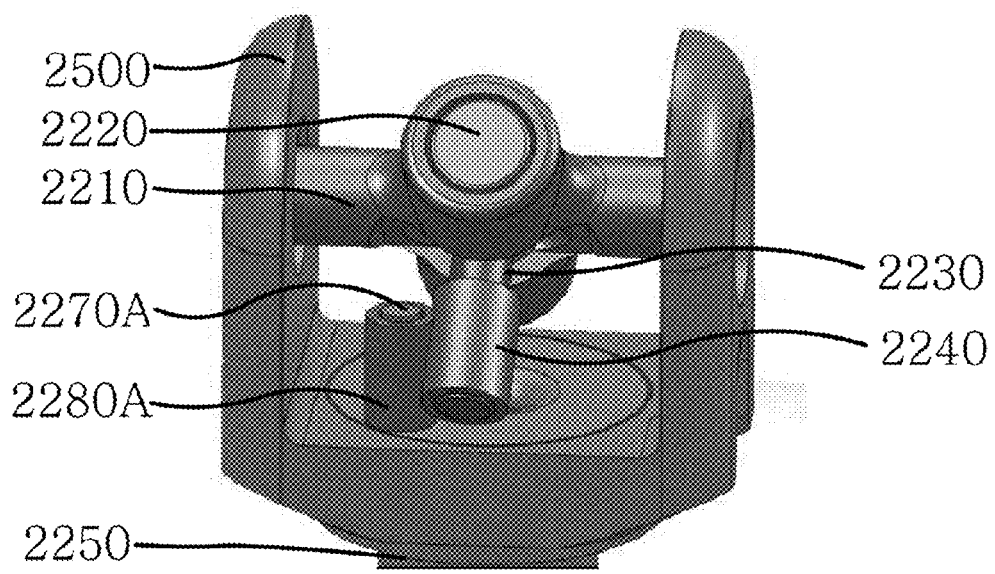
FIG. 35 is a perspective view illustrating a motion converter of a pan-tilt apparatus according to still another embodiment of the present invention.

As shown in FIG. 35, the motion converter 2000 according to still another embodiment may include the tilting shaft 2260, the panning shaft 2250 being inserted onto an outside of the tilting shaft 2260, the T-type tilting connector 2240 being installed on one side of an auxiliary shaft 2270A connected to the tilting shaft 2260, the T-type center mechanism 2220 being inserted into the connection pin 2230 that is inserted into the T-type tilting connector 2240, the T-type tilting mechanism 2210 being connected to the T-type center mechanism 2220 and of which both ends 2212 are inserted into the base member 2500, and the first and second worms 50 and 52 being inserted into the base member 2500 and being mutually connected with the first and second worm gears 40 and 42 to rotate.

In the motion converter 2000, the auxiliary shaft 2270A may be installed on one side of the T-type tilting connector 2240 and an auxiliary connector 2280A may be connected to the auxiliary shaft 2270A.

In the embodiment described above with reference to FIG. 31 through FIG. 34, a plurality of, for example, two auxiliary shafts 2270 and two auxiliary connectors 2280 are applied. However, in the embodiment of FIG. 35, the single auxiliary shaft 2270 and the single auxiliary connector 2280 may be applied.

An operation of the pan-tilt apparatus for the surveillance camera according to still another embodiment of the present invention (embodiment of FIG. 35) may be nearly similar to the aforementioned embodiment of FIG. 31 through FIG. 34. Only difference is that since the single auxiliary shaft 2270A and the single auxiliary connector 2280A are installed in the upper portion connected to the tilting shaft 2260, the T-type tilting connector 2240 installed on one side of the auxiliary connector 2280A may rotate when the tilting shaft 2260 of the motion converter 2000 rotates.

When the T-type tilting connector 2240 rotates, the T-type center mechanism 2220 may perform a horizontal motion through the connection pin 2230 connected to the T-type tilting connector 2240. The horizontal motion may operate in a manner similar to the aforementioned embodiment. The T-type tilting mechanism 2210 may convert the horizontal motion to reciprocal rotary motion.

In the pan-tilt apparatus for the surveillance camera according to still another embodiment (FIG. 36) of the present invention, the image capturing unit 100 and the driving unit 250 may be similar to the aforementioned embodiments and only the motion converter 2000 may be different from the aforementioned embodiments. Accordingly, description will be made only with respect to the motion converter 2000.

Figure 36:
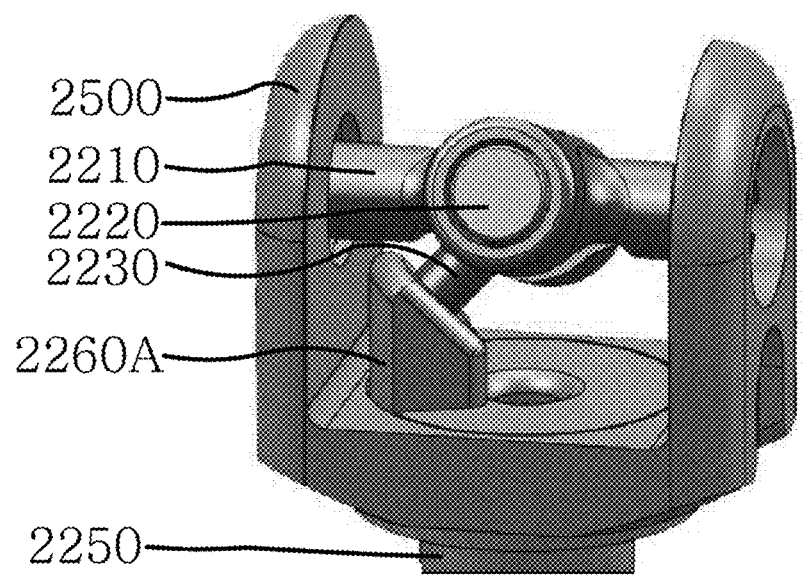
FIG. 36 is a perspective view illustrating a motion converter of a pan-tilt apparatus according to still another embodiment of the present invention.

As shown in FIG. 36, the motion converter 2000 according to still another embodiment may include a tilting shaft 2260 having an inclined member 2260A, a panning shaft 2250 being inserted into the tilting shaft 2260, a connection pin 2230 being inserted into the inclined member 2260A of the tilting shaft 2260, a T-type center mechanism 2220 being inserted into the connection pin 2230, a T-type tilting mechanism 2210 being connected to the T-type center mechanism 2220 and of which both ends 2212 are inserted into a base member 2500, and first and second worms 50 and 52 being inserted into the base member 2500 and being mutually connected with the first and second worm gears 40 and 42 to rotate.

The inclined member 2260A may be disposed on one upper side of the tilting shaft 2260. The inclined member 2260A and the T-type center mechanism 2220 may be connected to each other by means of the connection pin 2230. The connection pin 2230 may be mounted to be slidable between the inclined member 2260A and the T-type center mechanism 2220. The connection pin 2230 is slidably mounted and thus, may absorb a change in a height. Also, since the connection pin 2230 and the T-type center mechanism 2220 are applied, an assembly position thereof may be adjusted by compensating for tolerance in assembly.

In the meantime, even though the first and second worm gears 40 and 42, and the first and second worms 50 and 52 are applied herein, various types of gears may be applicable as the worm gear and the worm.

An operation of the pan-tilt apparatus for the surveillance camera according to still another embodiment (FIG. 36) of the present invention is nearly similar to the aforementioned embodiment (FIG. 35). Only difference lies in that the auxiliary shaft 2270a and the auxiliary connector 2280A are not applied and the inclined member 2260A is applied instead of the T-type tilting connector 2240.

According to still another embodiment of the present invention, when the tilting shaft 2260 of the motion converter 2000 rotates, the connection pin 2230 inserted into the inclined member 2260A may perform a conical motion whereby the T-type center mechanism 2220 may perform a horizontal motion. When the T-type center mechanism 2220 performs a horizontal motion, the T-type tilting mechanism 2210 may convert the horizontal motion to an orthogonal rotary motion, thereby generating a vertical reciprocal rotary motion.

Like the aforementioned embodiments, the pan-tilt apparatus for the surveillance camera according to still another embodiment of the present invention may also absorb a change in a height occurring due to a sliding motion between the connection pin 2230 and the inclined member 2260A and may compensate for tolerance in assembly, thereby adjusting an assembly position of the above members.

Figure 37:
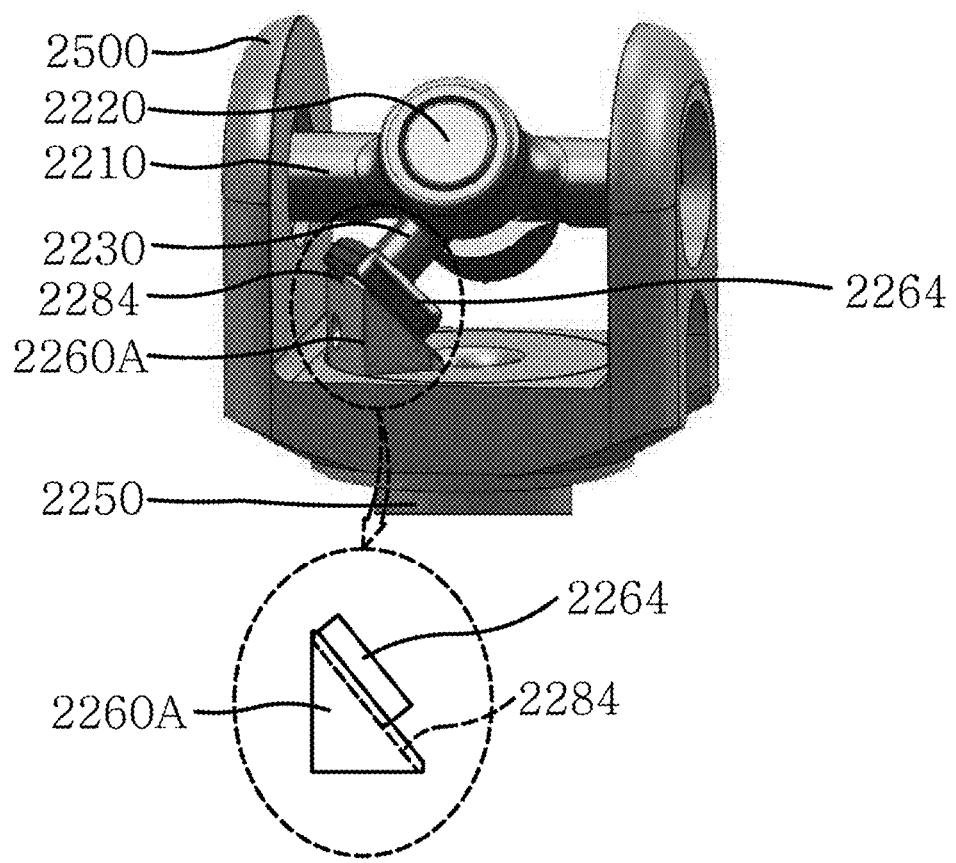
FIG. 37 is a perspective view illustrating a motion converter of a pan-tilt apparatus according to still another embodiment of the present invention.

In a pan-tilt apparatus for a surveillance camera according to still another embodiment (FIG. 37) of the present invention, a height adjustment member 2264 may be mounted to more accurately adjust the height of the connection pin 2230 instead of directly applying the connection pin 2230 to the inclined member 2260A of the aforementioned embodiment (FIG. 36). That is, in the motion converter 2000, the height adjustment member 2264 may be disposed between the inclined member 2260A of the tilting shaft 2260 and the connection pin 2230 to adjust the height of the connection pin 2230.

The height adjustment member 2264 may move along an elongated hole 2284 formed in the inclined member 2260A and adjust a height of the connection pin 2230 in moving of the connection pin 2230. That is, when the tilting shaft 2260 rotates, the height adjustment member 2264 may move along an oblique side while moving along the elongated hole 2284 of the inclined member 2260. Accordingly, the height adjustment member 2264 may adjust the height of the connection pin 2230.

An operation of the pan-tilt apparatus for the surveillance camera according to still another embodiment (FIG. 37) of the present invention may be nearly similar to the aforementioned embodiment (FIG. 36). Only difference lies in that when the tilting shaft 2260 rotates, the inclined member 2260A may also rotate. In this instance, the height adjustment member 2264 may move along the oblique side while moving along the elongated hole 2284 of the inclined member 2260A and thus, may adjust the height of the connection pin 2230. An operation of the T-type center mechanism 2220 and the T-type tilting mechanism 2210 connected with the connection pin 2230 may be similar to the aforementioned embodiments and thus, further detailed description will be omitted here.

In a pan-tilt apparatus for a surveillance camera according to still another embodiment (FIG. 38) of the present invention, an image capturing unit 100 and a driving unit 250 may be similar to the aforementioned embodiments and thus, further detailed description will be omitted here. Only a motion converter 3000 different from the aforementioned embodiments will be described in detail with reference to FIG. 38.

Figure 38:
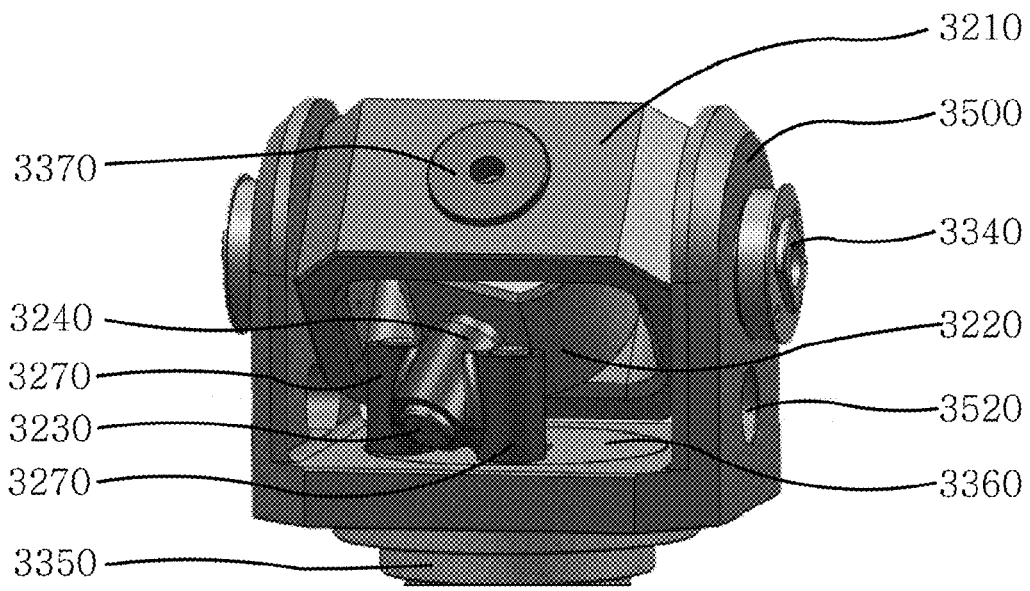
FIG. 38 is a perspective view illustrating a motion converter of a pan-tilt apparatus according to still another embodiment of the present invention.

As shown in FIG. 38, in the pan-tilt apparatus for the surveillance camera according to still another embodiment of the present invention, the motion converter 3000 may include a tilting shaft 3360, a panning shaft 3350 being inserted onto an outside of the tilting shaft 3360, an R-type tilting connector 3240 being inserted between a plurality of auxiliary shafts 3270 connected to the tilting shaft 3360, an R-type center mechanism 3220 being formed with a through hole 3222 to be inserted into a connection pin 3230 that is inserted into the R-type tilting connector 3240, a hollow R-type tilting mechanism 3210 being formed with facing through holes 3372 and pin holes 3274, and being inserted into a base member 3500, and first and second worms 50 and 52 being inserted into the base member 3500 and being mutually connected to first and second worms 40 and 42 to rotate.

As shown in FIG. 38, the R-type tilting connector 3240 may be disposed between the plurality of auxiliary shafts 3270, for example, two auxiliary shafts 3230 connected to the tilting shaft 3360. The connection pin 3230 may be movably inserted into the R-type tilting connector 3240.

Also, the connection pin 3230 may be inserted into the through hole 3222 formed in one lower side of the R-type center mechanism 3220, and the pin holes 3224 may be formed in upper and lower portions of one side thereof, respectively, and thereby be inserted with a center mechanism connection pin 3370, which will be described later.

The R-type tilting mechanism 3210 may be provided in a rectangular hollow type. The facing through holes 3372 may be formed in upper and lower portions of one side of the R-type tilting mechanism 3210, respectively, and the facing pin holes 3274 may be formed in upper and lower portions of another side of the R-type tilting mechanism 3210, respectively.

The R-type center mechanism 3220 may be inserted into the R-type tilting mechanism 3210 and the R-type tilting mechanism 3210 may be inserted into the base member 3500.

The R-type center mechanism 3220 of the motion converter 3000 may be inserted into the R-type tilting mechanism 3210 and thereby be combined therewith by means of the center mechanism connection pin 3370. The R-type tilting mechanism 3210 may be inserted into the base member 3500 and thereby be combined therewith by means of a tilting mechanism connection pin 3340.

In an operation of the pan-tilt apparatus for the surveillance camera according to still another embodiment (FIG. 38) of the present invention, when the tilting shaft 3360 rotates, the R-type tilting connector 3240 disposed between two auxiliary shafts 3270 connected to the tilting shaft 3360 may also rotate.

Since the connection pin 3230 is connected to the R-type tilting connector 3240, a center of the connection pin 3230 may perform a conical motion. The rotary motion (conical rotary motion) of the R-type center mechanism 3220 connected with the connection pin 3230 may generate the reciprocal rotary motion of the R-type tilting mechanism 3210 by employing the center mechanism connection pin 33270 as a rotation axis. That is, the R-type center mechanism 3220 may perform a rotary motion and in this instance, the rotary motion may be converted to an orthogonal rotary motion by the R-type tilting mechanism 3210. Accordingly, the reciprocal rotary motion of the R-type tilting mechanism 3210 enables the camera holder 4 to perform a tilting motion through the tilting mechanism connection pin 3340.

Figure 39:
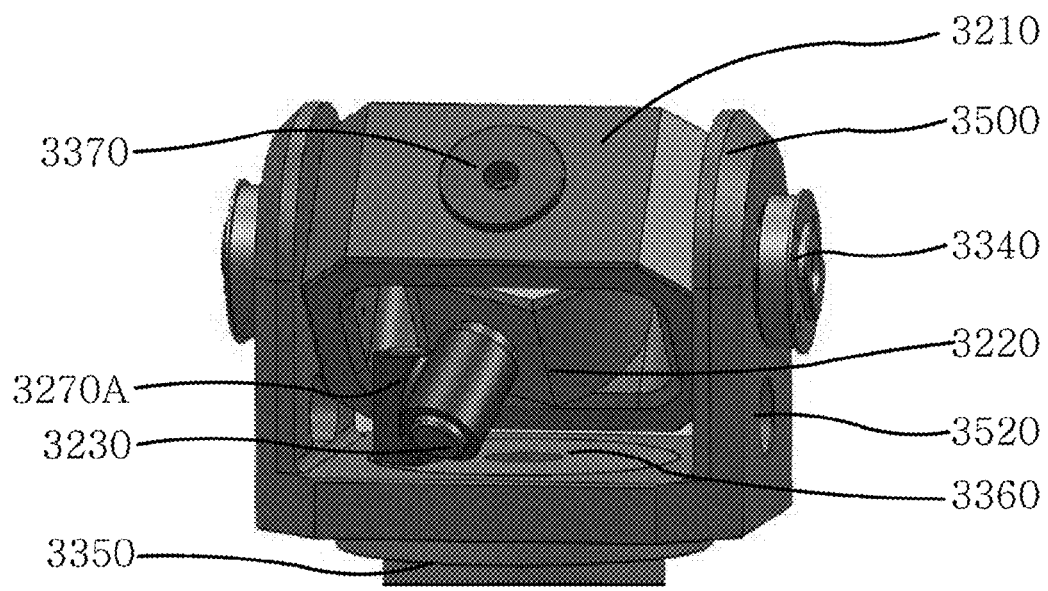
FIG. 39 is a perspective view illustrating a motion converter of a pan-tilt apparatus according to still another embodiment of the present invention.

A difference between a pan-tilt apparatus for a surveillance camera according to still another embodiment (FIG. 39) of the present invention and the aforementioned embodiment (FIG. 38) lies in that only the single auxiliary shaft 3270A is applied in the motion converter 3000. Specifically, the aforementioned embodiment applies two auxiliary shafts and applies the R-type tilting connector between the two auxiliary shafts whereas the present embodiment applies the single auxiliary shaft 3270A.

According to still another embodiment of the present invention, the auxiliary shaft 3270A may be installed in an upper portion connected to the tilting shaft 3360 and the R-type tilting connector 3240 may be installed on one side of the auxiliary shaft 3270A.

As described above, the difference between the pan-tilt apparatus for the surveillance camera according to still another embodiment (FIG. 39) of the present invention and the aforementioned embodiment (FIG. 38) lies in that only the single auxiliary shaft 3270A is applied in the motion converter 3000 and thus, operation relationship may be similar to the aforementioned embodiment. Accordingly, further detailed description will be omitted here.

In a pan-tilt apparatus for a surveillance camera according to still another embodiment (FIG. 40) of the present invention, an image capturing unit 100 and a driving unit 250 may be similar to the aforementioned embodiments and thus, further detailed description will be omitted here. Only a motion converter 3000 different from the aforementioned embodiments will be described with reference to FIG. 40.

Figure 40:
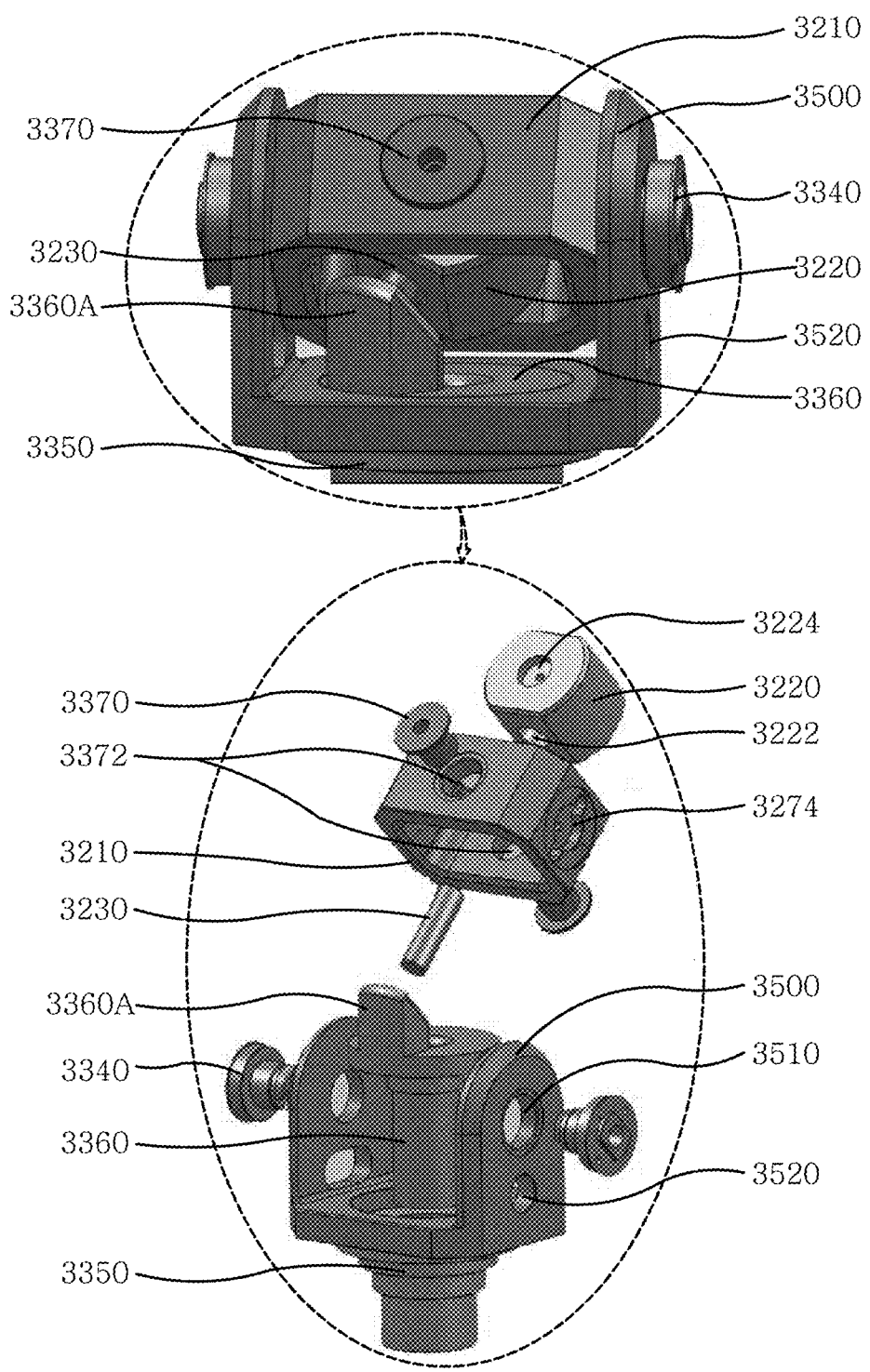
FIG. 40 is a perspective view illustrating a motion converter of a pan-tilt apparatus according to still another embodiment of the present invention.

According to still another embodiment of the present invention, the motion converter 3000 may include a tilting shaft 3360 having an inclined member 3360A, a panning shaft 3350 being inserted onto an outside of the tilting shaft 3360, a connection pin 3230 being inserted into the inclined member 3360A of the tilting shaft 3360, an R-type center mechanism 3220 being formed with a through hole 3222 to be inserted with the connection pin 3230, a hollow R-type tilting mechanism 3210 being formed with facing through holes 3372 and pin holes 3274 and being inserted into a base member 3500, the base member 3500 being inserted with the tilting shaft 3360 and the panning shaft 3350 and being inserted with the R-type center mechanism 3220 and the R-type tilting mechanism 3210, and first and second worms 50 and 52 being inserted into the base member 3500 and being mutually connected with first and second worms 40 and 42 to rotate As shown in FIG. 40, the inclined member 3360A may be installed in an upper portion of the tilting shaft 3360 and the connection pin 3230 may be slidably mounted to the inclined member 3360A. Like the aforementioned embodiment, the connection pin 3230 may be inserted into the through hole 3222 of the R-type center mechanism 3220. Also, connection relationship between the R-type tilting mechanism 3210 and the base member 3500 may be similar to the aforementioned embodiment and thus, further detailed description will be omitted here.

In an operation of the pan-tilt apparatus for the surveillance camera according to still another embodiment (FIG. 40) of the present invention, when the tilting shaft 3360 rotates, the inclined member 3360A connected to the tilting shaft 3360 may also rotate. In this instance, a center of the connection pin 3230 inserted into the inclined member 3360A may perform a conical motion. A rotary motion (conical rotary motion) of the R-type center mechanism 3220 connected with the connection pin 3230 may generate a reciprocal rotary motion of the R-type tilting mechanism 3210 by employing the center mechanism connection pin 3370 as a rotation axis. That is, the R-type center mechanism 3220 may rotate and in this instance, the rotary motion may be converted to an orthogonal rotary motion by the R-type titling mechanism 3210. Accordingly, the reciprocal rotary motion of the R-type tilting mechanism 3210 enables the camera holder 4 to perform a tilting motion through the tilting mechanism connection pin 3340.

In a pan-tilt apparatus for a surveillance camera according to still another embodiment (FIG. 41) of the present invention, a height adjustment member 3264 may be provided to more accurately adjust a height of the connection pin 3230 instead of directly applying the connection pin 3230 to the inclined member 3360A of the aforementioned embodiment (FIG. 40).

As shown in FIG. 41, in the motion converter 3000, only a configuration of providing the height adjustment member 3264 between the inclined member 3360A of the tilting shaft 3360 and the connection pin 3230 to adjust the height of the connection pin 3230 is different from the aforementioned embodiment.

The height adjustment member 3264 may be mounted to be movable along an elongated hole 3284 formed in the inclined member 3360A, and may adjust the height of the connection pin 3230 in moving of the connection pin 3230. That is, when the tilting shaft 3360 rotates, the height adjustment member 3264 may move along an oblique side while moving along the elongated hole 3284 of the inclined member 3360A and thereby adjust the height of the connection pin 3230.

An operation of the pan-tilt apparatus for the surveillance camera according to still another embodiment (FIG. 41) of the present invention may be nearly similar to the aforementioned embodiment (FIG. 40). Only difference lies in that when the tilting shaft 3360 rotates, the inclined member 3360A may also rotate. In this instance, the height adjustment member 3264 may move along the oblique side while moving along the elongated hole 3284 of the inclined member 3360A and thus, may adjust the height of the connection pin 2230. An operation of the T-type center mechanism 3220 and the T-type tilting mechanism 3210 connected with the connection pin 3230 may be similar to the aforementioned embodiments and thus, further detailed description will be omitted here.

As described above, a pan-tilt apparatus for a surveillance camera according to the present invention enables a camera to perform a panning/tilting motion in a very simple structure and thus, may readily watch a quickly moving object. In addition, since a motion converter and a motor installer of the pan-tilt apparatus are separately configured, it is advantageous in maintenance and repair. Also, the pan-tilt apparatus may absorb a height change occurring due to an accumulated tolerance by providing a height-changeable tilting connector to a motion converter.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A pan-tilt apparatus comprising:
   an image capturing unit comprising a camera and a camera holder for supporting the camera;
   a motion converter comprising a driving shaft, a shaft being connected to a connector that is inserted into the driving shaft, a base member being inserted into one side of the driving shaft and of which both ends are inserted into the shaft by including a bearing, a bearing being installed in a lower portion of the base member to smoothen an operation of the base member, a first worm being inserted into the base member and being mutually connected with a first worm gear to rotate, and a second worm being inserted into the driving shaft and being mutually connected with a second worm gear to rotate; and
   a driving unit comprising a first motor and a second motor being respectively connected to a first motor shaft and a second motor shaft that are inserted into the first worm gear and the second worm gear, respectively,
   wherein both ends of the camera holder of the image capturing unit are inserted into the shaft of the motion converter for panning and tilting,
   a slope is formed on one side of the driving shaft of the motion converter, a through hole is formed in the slope, and a through hole is formed in each of the connector and the shaft, and
   the connector is inserted into the through hole of the slope, and the connector and the shaft are connected to each other by matching the through hole of the connector and the through hole of the shaft and then inserting a pin into the matched through holes.

2. The pan-tilt apparatus of claim 1, wherein:
an auxiliary frame is further installed in the lower portion of the motion converter, and
a slip ring is installed in the driving shaft to verify a position of a panning motion and a position of a tilting motion within the auxiliary frame.

3. A pan-tilt apparatus comprising:
an image capturing unit comprising a camera and a camera holder for supporting the camera;
a motion converter comprising a driving shaft, a shaft being connected to a C-type connector that is inserted into the driving shaft, a base member being inserted into one side of the driving shaft and of which both ends are inserted into the shaft, a first worm being mutually connected with a first worm gear to rotate, and a second worm being inserted into the driving shaft and being mutually connected with the second worm gear to rotate; and
a driving unit comprising a first motor and a second motor being respectively connected to a first motor shaft and a second motor shaft that are inserted into the first worm gear and the second worm gear, respectively,
wherein both ends of the camera holder of the image capturing unit are inserted into the shaft of the motion converter for panning and tilting, and
a through hole is formed in each of both ends of the C-type connector of the motion converter, a protrusion is formed on a center of the shaft, and the protrusion of the shaft is inserted into the through hole of the C-type connector and thereby is connected to the C-type connector.

4. The pan-tilt apparatus of claim 3, wherein:
an auxiliary frame is further installed in a lower portion of the motion converter, and
a slip ring is installed in a driving shaft to verify a position of a panning motion and a position of a tilting motion within the auxiliary frame.

5. A pan-tilt apparatus comprising:
a support portion comprising a holder for supporting any one of a camera, a scanner, and a gun type;
a motion converter comprising a driving shaft having a slope, a driving member being formed with a through hole on its one side to be inserted with a bearing having a shaft and being formed with a hole on its another side to insert a connection pin, a connection shaft being formed with a through hole on its one side to be inserted with the connection pin and being formed with a protrusion on its another side, a plurality of bearings being mounted to the connection shaft, a panning shaft being inserted with the driving shaft, a plurality of bearings being inserted into a bearing frame to smoothen a rotation of the panning shaft, a first worm being inserted into the panning shaft, a first worm shaft being installed with a first worm gear that is screw combined with the first worm, a first upper pulley being inserted into the first worm shaft, a first lower pulley being mutually connected with the first upper pulley by including a first belt, a second worm being inserted into the driving shaft, a second worm shaft being installed with a second worm gear that is screw combined with the second worm, a second upper pulley being inserted into the second worm shaft, and a second lower pulley being mutually connected with the second upper pulley by including a second belt; and
a driving unit comprising a first motor and a second motor being respectively connected to a first motor shaft and a second motor shaft that are inserted into the first lower pulley and the second lower pulley, respectively.

6. A pan-tilt apparatus comprising:
a support portion comprising a holder for supporting any one of a camera, a scanner, and a gun type;
a motion converter comprising a driving shaft having a slope, a driving member being formed with a through hole on its one side to be inserted with a bearing having a shaft and being formed with a hole on its another side to insert a connection pin, a connection shaft being formed with a through hole on its one side to be inserted with the connection pin and being formed with a protrusion on its another side, a plurality of bearings being mounted to the connection shaft, a panning shaft being inserted with the driving shaft, a plurality of bearings being inserted into a bearing frame to smoothen a rotation of the panning shaft, a first worm being inserted into the panning shaft, a first worm shaft being installed with a first worm gear that is screw combined with the first worm, a first upper pulley being inserted into the first worm shaft, a first lower pulley being mutually connected with the first upper pulley by including a first belt, a second worm being inserted into the driving shaft, a second worm shaft being installed with a second worm gear that is screw combined with the second worm, a second upper pulley being inserted into the second worm shaft, and a second lower pulley being mutually connected with the second upper pulley by including a second belt;
a driving unit comprising a first motor and a second motor being respectively connected to a first motor shaft and a second motor shaft that are inserted into the first lower pulley and the second lower pulley, respectively; and
a pan-tilt controller being connected to the driving unit to control the first and second motors, so that the support portion performs panning motion or tilting motion by means of the motion converter.

7. The pan-tilt apparatus of claim 6, wherein the pan-tilt controller comprises:
a power supply being supplied with an alternating current (AC) from an outside to convert the AC to a direct current (DC) and output the converted DC;
a motor driver selectively receiving first and second motor control signals to drive the first and second motors of the driving unit so that the support portion performs panning motion or tilting motion by means of the motion converter;
first and second position sensors sensing rotation positions of the first and second worms of the motion converter to output sensed position signals; and
a controller being supplied with the DC output from the power supply and receiving the sensed position signals output from the first and second position sensors to determine a position of the support portion, receiving an external control signal (CTL) to determine whether the external control signal CTL corresponds to an active mode or a standby mode, and generating and selectively outputting first and second motor control signals for the panning motion or the tilting motion of the support portion.

8. A pan-tilt apparatus for a surveillance camera, comprising:
an image capturing unit comprising a camera and a camera holder for supporting the camera;
a motion converter comprising a tilting shaft, a panning shaft being inserted onto an outside of the tilting shaft, a T-type tilting connector being inserted into one side of at least one auxiliary shaft that is connected to the tilting shaft, a T-type center mechanism being inserted into a connection pin that is inserted into the T-type tilting connector, a T-type tilting mechanism being connected to the T-type center mechanism and of which both ends are inserted into a base member, and first and second worms being inserted into the base member and being mutually connected with first and second worm gears to rotate; and a driving unit comprising a first motor and a second motor being respectively connected to a first motor shaft and a second motor shaft that are inserted into the first worm gear and the second worm gear, respectively, wherein when the tilting shaft of the motion converter rotates, the T-type center mechanism performs horizontal motion through the connection pin connected to the T-type tilting connector and the T-type tilting mechanism converts the horizontal motion to a reciprocal rotary motion.

9. The pan-tilt apparatus of claim 8, wherein the auxiliary shaft of the T-type tilting connector of the motion converter is movably inserted into an auxiliary connector.

10. A pan-tilt apparatus for a surveillance camera, comprising:

a support portion comprising a camera and a camera holder for supporting the camera;

a motion converter comprising a tilting shaft having an inclined member, a panning shaft being inserted onto an outside of the tilting shaft, a connection pin being inserted into the inclined member of the tilting shaft, a T-type center mechanism being inserted into the connection pin, a T-type tilting mechanism being connected to the T-type center mechanism and of which both ends are inserted into a base member, and first and second worms being inserted into the base member and being mutually connected with first and second worm gears to rotate; and a driving unit comprising a first motor and a second motor being respectively connected to a first motor shaft and a second motor shaft that are inserted into the first worm gear and the second worm gear, respectively, wherein when the tilting shaft of the motion converter rotates, the T-type center mechanism performs horizontal motion through the connection pin inserted into the inclined member of the tilting shaft and the T-type tilting mechanism converts the horizontal motion to a reciprocal rotary motion.

11. The pan-tilt apparatus of claim 10, wherein the motion converter further comprises a height adjustment member moving along an elongated hole formed in the inclined member of the tilting shaft to adjust a height of the connection pin inserted into the inclined member of the titling shaft.

12. A pan-tilt apparatus for a surveillance camera, comprising:

an image capturing unit;

a motion converter comprising a tilting shaft, a panning shaft being inserted onto an outside of the tilting shaft, an R-type tilting connector being inserted into one side of at least one auxiliary shaft that is connected to the tilting shaft, an R-type center mechanism being formed with a through hole to be inserted into a connection pin that is inserted into the R-type tilting connector, a hollow R-type tilting mechanism being formed with a through hole and a pin hole that face each other, and being inserted into a base member, and first and second worms being inserted into the base member and being mutually connected with first and second worm gears to rotate; and a driving unit comprising a first motor and a second motor being respectively connected to a first motor shaft and a second motor shaft that are inserted into the first worm gear and the second worm gear, respectively, wherein when the tilting shaft of the motion converter rotates, the R-type center mechanism performs rotary motion through the connection pin connected to the R-type tilting connector and enables the R-type tilting mechanism to perform conversion to the rotary motion.

13. The pan-tilt apparatus of claim 12, wherein the R-type center mechanism of the motion converter is inserted into the R-type tilting mechanism and thereby is combined by a center mechanism connection pin, and the R-type tiling mechanism is inserted into the base member and thereby is combined by a tilting mechanism connection pin.

14. A pan-tilt apparatus for a surveillance camera, comprising:

an image capturing unit;

a motion converter comprising a tilting shaft having an inclined member, a panning shaft being inserted onto an outside of the tilting shaft, a connection pin being inserted into the inclined member of the tilting shaft, an R-type center mechanism being formed with a through hole to be inserted with the connection pin, a hollow R-type tilting mechanism being formed with a through hole and a pin hole that face each other, and being inserted into a base member, the base member being inserted with the tilting shaft and the panning shaft and being inserted with the R-type center mechanism and the R-type tilting mechanism, and first and second worms being inserted into the base member and being mutually connected with first and second worm gears to rotate; and a driving unit comprising a first motor and a second motor being respectively connected to a first motor shaft and a second motor shaft that are inserted into the first worm gear and the second worm gear, respectively, wherein when the tilting shaft of the motion converter rotates, the R-type center mechanism performs rotary motion through the connection pin being inserted into the inclined member, and enables the R-type tilting mechanism to perform conversion to the rotary motion.

15. The pan-tilt apparatus of claim 14, wherein the motion converter further comprises a height adjustment member adjusting a height of the connection pin inserted into the inclined member of the tilting shaft.

* * * * *